US012777367B2

(12) United States Patent
Kanamarlapudi et al.

(10) Patent No.: US 12,777,367 B2
(45) Date of Patent: Oct. 27, 2026

(54) BSR TRIGGER ENHANCEMENTS

(71) Applicant: QUALCOMM Incorporated, San Diego, CA (US)

(72) Inventors: Sitaramanjaneyulu Kanamarlapudi, San Diego, CA (US); Linhai He, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 338 days.

(21) Appl. No.: 18/405,705

(22) Filed: Jan. 5, 2024

(65) Prior Publication Data

US 2024/0244478 A1 Jul. 18, 2024

Related U.S. Application Data

(60) Provisional application No. 63/479,964, filed on Jan. 13, 2023.

(51) Int. Cl.

| | |
|---|---|
| ***H04W 28/02*** | (2009.01) |
| ***H04L 1/00*** | (2006.01) |
| ***H04L 43/16*** | (2022.01) |

(52) U.S. Cl.

CPC ....... *H04W 28/0278* (2013.01); *H04L 1/0005* (2013.01); *H04L 43/16* (2013.01); *H04W 28/0268* (2013.01)

(58) Field of Classification Search

CPC ......... H04W 28/0278; H04W 28/0268; H04W 72/21; H04L 1/0005; H04L 43/16; H04L 1/0001

See application file for complete search history.

(56) References Cited

U.S. PATENT DOCUMENTS

2012/0300744 A1* 11/2012 Larmo .................. H04W 24/10 370/329
2018/0110076 A1* 4/2018 Ko ........................ H04L 1/1614
(Continued)

FOREIGN PATENT DOCUMENTS

CN 107277856 A 10/2017
WO 2021157888 A1 8/2021
(Continued)

OTHER PUBLICATIONS

Dell Technologies: "BSR Feedback Enhancements for XR", 3GPP TSG-RAN WG2 Meeting #120, R2-2211275, Type Discussion, FS_NR XR ENH, 3rd Generation Partnership Project, Mobile Competence Centre, 650, Route Des Lucioles, F-06921 Sophia-Antipolis Cedex, France, vol. 3GPP RAN 2, No. Toulouse, FR, Nov. 14, 2022-Nov. 18, 2022, Nov. 3, 2022, 7 Pages, XP052215387, p. 6, paragraph before Proposal 8 and Proposal 8.
(Continued)

*Primary Examiner* — Shawn D Miller
(74) *Attorney, Agent, or Firm* — Procopio, Cory, Hargreaves & Savitch LLP

(57) ABSTRACT

A method for wireless communication at a user equipment (UE) and related apparatus are provided. In the method, the UE transmits, to a network entity, a buffer status reporting (BSR) in response to a BSR triggering condition from multiple BSR triggering conditions being met. Each of the multiple BSR triggering conditions is associated with a Protocol Data Unit (PDU) set including a group of PDUs. The UE further communicates with the network entity based on the BSR. The method provides multiple BSR triggering conditions based on various scenarios in data transmission. It allows the BSR information to be readily available to the network and enables an efficient resource allocation.

30 Claims, 14 Drawing Sheets

(56) References Cited

U.S. PATENT DOCUMENTS

| | | | | |
|---|---|---|---|---|
| 2020/0137754 | A1 | 4/2020 | Kim et al. | |
| 2020/0178115 | A1 | 6/2020 | Lee et al. | |
| 2022/0232408 | A1 | 7/2022 | Lee et al. | |
| 2022/0272758 | A1 | 8/2022 | Agiwal et al. | |
| 2023/0063556 | A1* | 3/2023 | Cho | H04W 72/21 |
| 2023/0232277 | A1 | 7/2023 | Yi | |
| 2024/0121663 | A1* | 4/2024 | Malik | H04L 47/32 |
| 2025/0301366 | A1* | 9/2025 | Chen | H04W 28/0278 |

FOREIGN PATENT DOCUMENTS

| | | | |
|---|---|---|---|
| WO | 2023108413 | A1 | 6/2023 |
| WO | 2023154845 | A1 | 8/2023 |

OTHER PUBLICATIONS

Interdigital Inc: "Discussion on XR-Specific Capacity Improvements", 3GPP RAN WG2 Meeting #119-e, R2-2207491, 3rd Generation Partnership Project, Mobile Competence Centre, 650, Route Des Lucioles, F-06921 Sophia-Antipolis Cedex, France, vol. RAN WG2, No. Electronic, Aug. 17, 2022-Aug. 29, 2022, Aug. 10, 2022, 7 pages, XP052260811, p. 3, sub-section DG enhancements for handling PDU sets, Paragraph between pp. 4 and 5, and Proposal 10, Section 2.2 Supporting multiple XR traffic flows/patterns.

International Search Report and Written Opinion—PCT/US2024/010738—ISA/EPO—May 13, 2024.

NEC: "BSR Enhancements for XR", 3GPP TSG-RAN WG2 #120, R2-2212235, Type Discussion, FS_NR XR ENH, 3rd Generation Partnership Project, Mobile Competence Centre, 650, Route Des Lucioles, F-06921 Sophia-Antipolis Cedex, France, vol. 3GPP RAN 2, No. Toulouse, FR, Nov. 14, 2022-Nov. 18, 2022, Nov. 3, 2022, 4 pages, XP052216319, Section 2.1 New BSR triggers.

Nokia, et al., "BS Tables for XR", 3GPP TSG-RAN WG2 Meeting #120, R2-2211600, Type discussion, FS_NR XR ENH, 3rd Generation Partnership Project, Mobile Competence Centre, 650, Route Des Lucioles, F-06921 Sophia-Antipolis Cedex, France, vol. 3GPP RAN 2, No. Toulouse, FR, Nov. 14, 2022-Nov. 18, 2022, Nov. 4, 2022, 6 Pages, XP052215705, A Section 2.2 Delay information, p. 5, paragraph before Proposal 4.

* cited by examiner

BSR TRIGGER ENHANCEMENTS

CROSS REFERENCE TO RELATED APPLICATION(S)

This application claims the benefit of and priority to U.S. Provisional Application Ser. No. 63/479,964, entitled "BSR TRIGGER ENHANCEMENTS" and filed on Jan. 13, 2023, which is expressly incorporated by reference herein in its entirety.

TECHNICAL FIELD

The present disclosure relates generally to communication systems, and more particularly, to Buffer Status Reporting (BSR) trigger enhancements for wireless communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus may include memory and at least one processor coupled to the memory. Based at least in part on information stored in the memory, the at least one processor may be configured to transmit, to a network entity, a buffer status reporting (BSR) in response to a BSR triggering condition from multiple BSR triggering conditions being met, wherein each of the multiple BSR triggering conditions is associated with a Protocol Data Unit (PDU) set including a group of PDUs; and communicate, based on the BSR, with the network entity.

In an aspect of the disclosure, a method, a computer-readable medium, and an apparatus are provided for wireless communication at a network entity. The apparatus may include memory and at least one processor coupled to the memory. Based at least in part on information stored in the memory, the at least one processor may be configured to receive, from a UE, a BSR, wherein the BSR is received in response to one BSR triggering condition of multiple BSR triggering conditions being met, wherein each of the multiple BSR triggering conditions is associated with a PDU set including a group of PDUs; and communicate, based on the BSR, with the UE.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
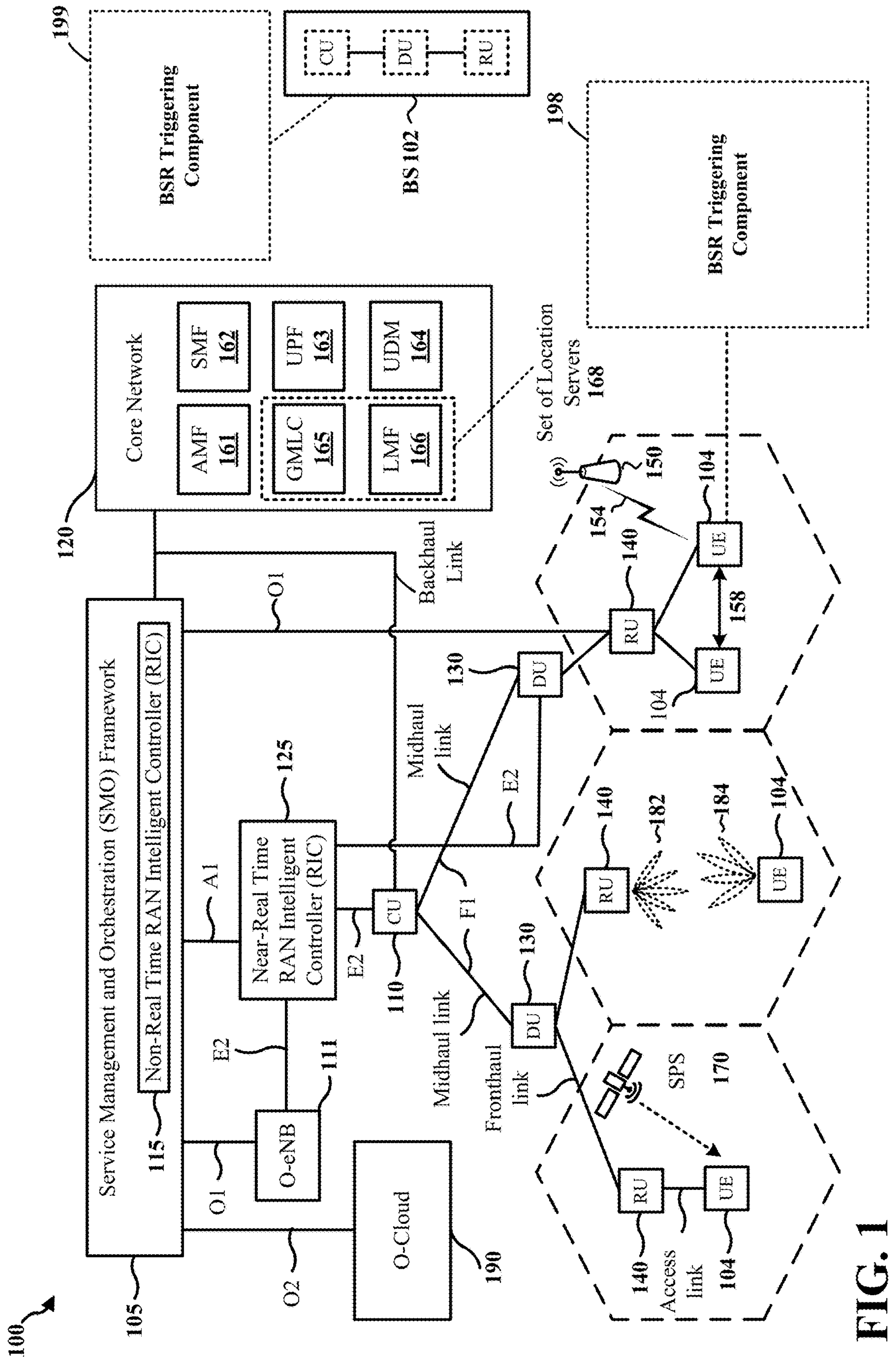
FIG. 1 is a diagram illustrating an example of a wireless communication system and an access network.

In wireless communication systems, such as Long-Term Evolution (LTE) and 5G systems, a buffer status report (BSR) provides the network with information about the data waiting to be transmitted from a user equipment (UE). The UE transmits a BSR that indicates the buffer status of the UE, which may facilitate the network to more efficiently allocate resources for wireless communication with the UE. The BSR transmission may be triggered based on an occurrence of one or more BSR trigger conditions (or BSR triggers), such as the expiration of a timer. The BSR triggers may further be associated with the type of BSR, e.g., whether a BSR is a short, long, or truncated BSR. Aspects provided herein further provide for BSR trigger conditions associated with the reason for which the BSR was triggered. In the current BSR mechanisms, one set of BSR trigger conditions may correspond to one medium access control (MAC) entity, and the single set of conditions may be applied to each of the logical channel groups (LCGs), radio bearer (DRB), protocol data unit (PDU) sessions, and application flows of the MAC entity. Example aspects presented herein provide the capability to enable various triggers associated with a PDU set (e.g., a group of PDUs associated with an application frame (e.g., a video frame)) level, rather than the PDU level.

Various aspects relate generally to wireless communication and more particularly to BSR triggering enhancements. Some aspects more specifically relate to the configurations of multiple BSR triggering conditions. In some examples, a UE may transmit, to a network entity, a buffer status reporting (BSR) in response to a BSR triggering condition from multiple BSR triggering conditions being met. Each of the multiple BSR triggering conditions may be associated with a PDU set including a group of PDUs. The UE may further communicate with the network entity based on the BSR.

Particular aspects of the subject matter described in this disclosure can be implemented to realize one or more of the following potential advantages. In some examples, by enabling a UE to use multiple BSR triggering conditions associated with the data transmission, the described techniques can be used to make the BSR information more readily available to the network and to enable a more efficient resource allocation. Thus, it improves the efficiency of wireless communication.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/ purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (CNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) (e.g., one or more of a Global Navigation Satellite System (GNSS), global position system (GPS) 170, non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a BSR triggering component 198. The BSR triggering component 198 may be configured to transmit, to a network entity, a BSR in response to a BSR triggering condition from multiple BSR triggering conditions being met, where each of the multiple BSR triggering conditions is associated with a PDU set including a group of PDUs associated with a frame of an application; and communicate, based on the BSR, with the network entity. In certain aspects, the base station 102 may include a BSR triggering component 199. The BSR triggering component 199 may be configured to receive, from a UE, a BSR, where the BSR is received in response to one BSR triggering condition of multiple BSR triggering conditions being met, wherein each of the multiple BSR triggering conditions is associated with a PDU set including a group of PDUs associated with a frame of an application; and communicate, based on the BSR, with the UE. Although the following description may be focused on 5G NR, the concepts described herein may be applicable to other similar areas, such as LTE, LTE-A, CDMA, GSM, and other wireless technologies.

Figures 2A, 2B, 2C, 2D:
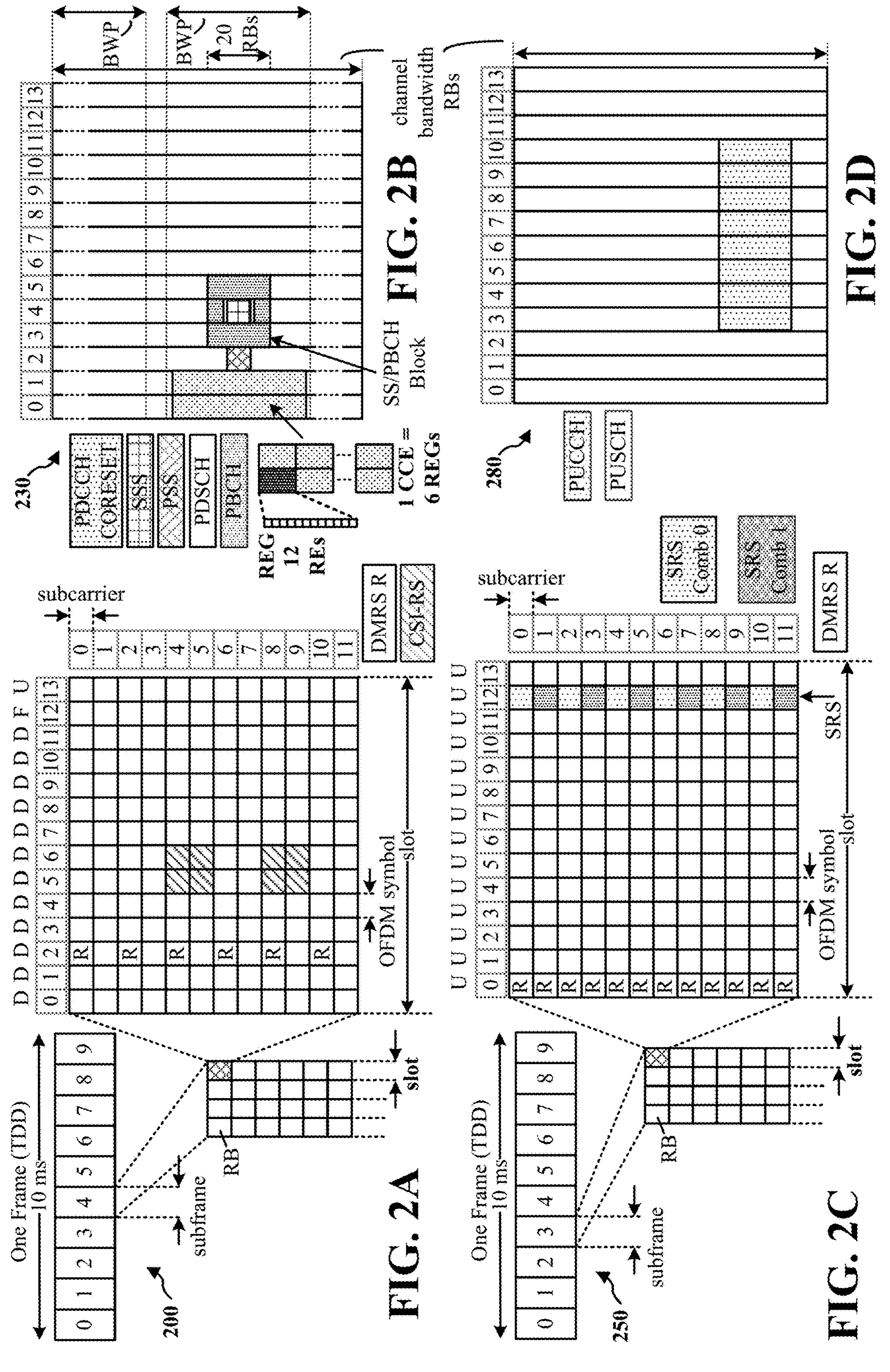
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
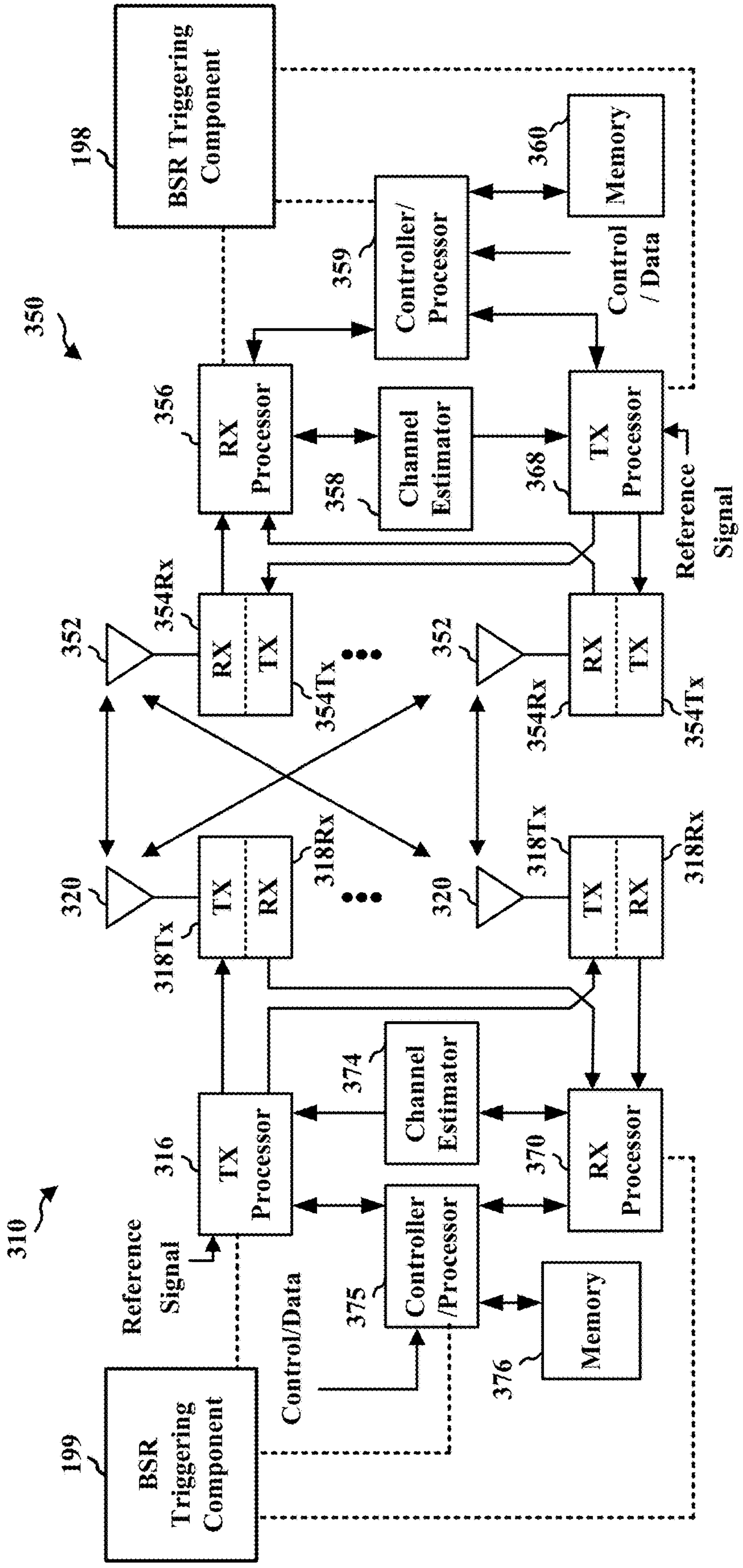
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units, error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the BSR triggering component 198 of FIG. 1.

At least one of the TX processor 316, the RX processor 370, and the controller/processor 375 may be configured to perform aspects in connection with the BSR triggering component 199 of FIG. 1.

A UE may have uplink data to transmit to a network. The UE may transmit a BSR, e.g., in a MAC-CE from the UE to the network, with information regarding the amount of data in the UE's buffer waiting to be sent, e.g., transmitted, to the network. By sending a BSR to a network, the UE requests, or informs, the network to provide a UL grant (e.g., allocating or granting a transmission resource to the UE), through which the UE may transmit the data to the network. Upon receiving a BSR from the UE, the network may allocate a corresponding amount of resources in a UL grant (e.g., scheduling a transmission resource) for the UE to use for a UL transmission, the amount of resources being based on the amount of data that the BSR indicated.

Figure 4B:
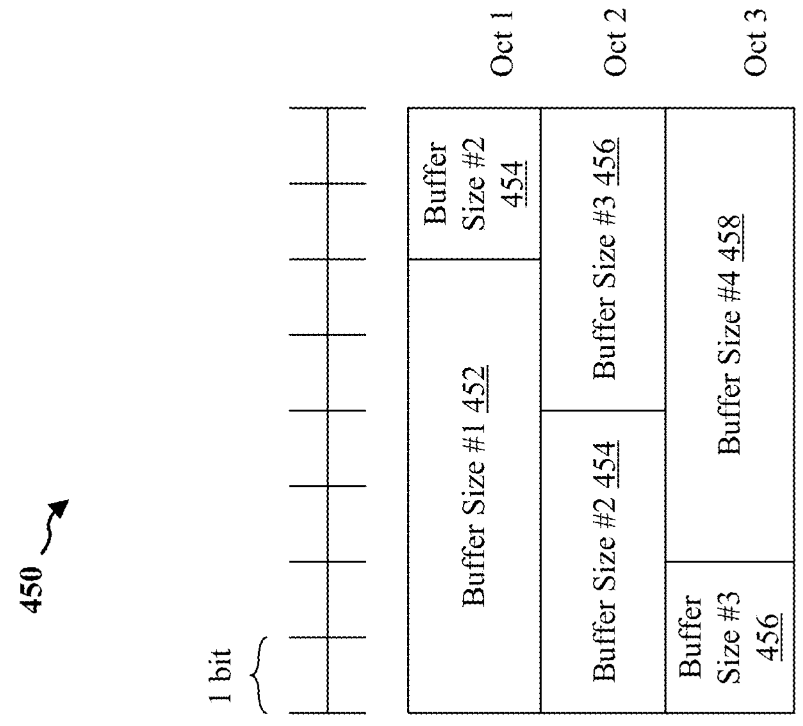
FIGS. 4A and 4B are diagrams illustrating example data structures of buffer status reporting (BSR).
Figure 4A:
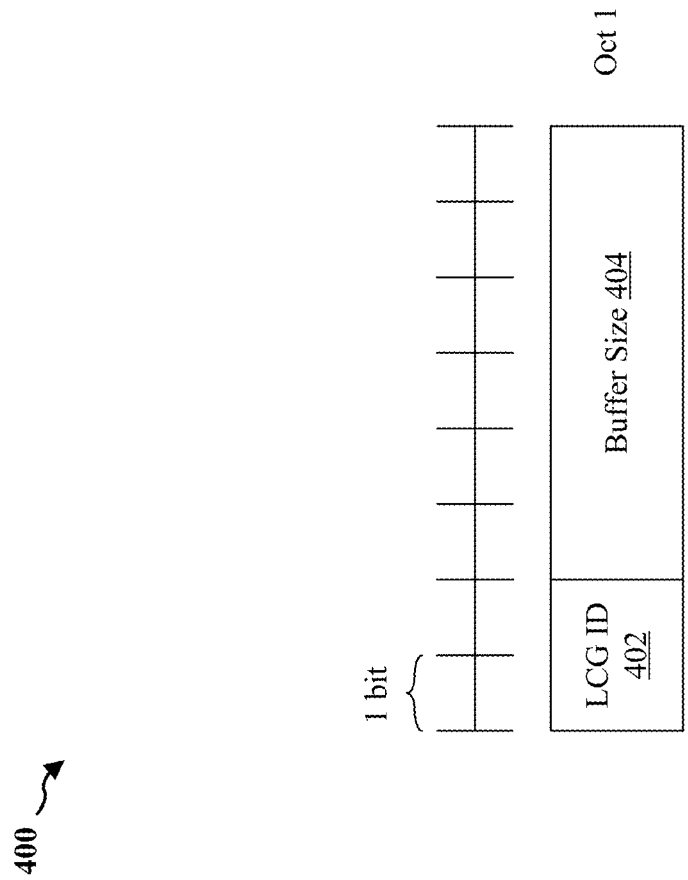

A BSR may have different data structures and transmission timing. For example, a BSR may be a long BSR or a short BSR, depending on its data structure. A short BSR may indicate the amount of data in the UE's buffer for a single LCG, while a long BSR may indicate the amount of data in the UE's buffer for multiple LCGs. FIG. 4A is a diagram 400 illustrating an example data structure of a short BSR. As shown in FIG. 4A, a short BSR may include an LCG ID 402 of the single LCG and a Buffer Size 404. The LCG ID 402 may be 2 bits, for example, and the Buffer Size 404 may include 6 bits, as an example. The Buffer Size 404 may indicate the amount of data for the LCG indicated by the LCG ID 402. FIG. 4B is a diagram 450 illustrating an example data structure of a long BSR. As shown in FIG. 4B, a long BSR may include multiple Buffer Size fields, such as Buffer Size #1 452, Buffer Size #2 454, Buffer Size #3 456, and Buffer Size #4 458. Each of these Buffer Size fields may include 6 bits, as an example, and indicate the amount of data for one LCG, and different Buffer Sizes may indicate the amount of data for different LCGs.

A BSR may be an aperiodic BSR or a periodic BSR based on the timing at which the BSR is sent to the network. A UE may transmit an aperiodic BSR, which may be referred to as a regular BSR in some aspects, in response to the arrival of new data in the UE's buffer, and based on the new data having a higher priority than the data already waiting in the UE's buffer. A UE may use regular BSR to inform the network about the change in its buffer status, allowing the network to update its resource allocation and scheduling decisions accordingly. On the other hand, the UE may also transmit a periodic BSR according to a preset periodicity, e.g., a periodicity that may be configured by the network for BSR transmission. Since a periodic BSR is sent regardless of the change in the buffer status, it may not necessarily indicate a change in the buffer status (e.g., the arrival of new data), as is the case with regular BSRs.

Figure 5:
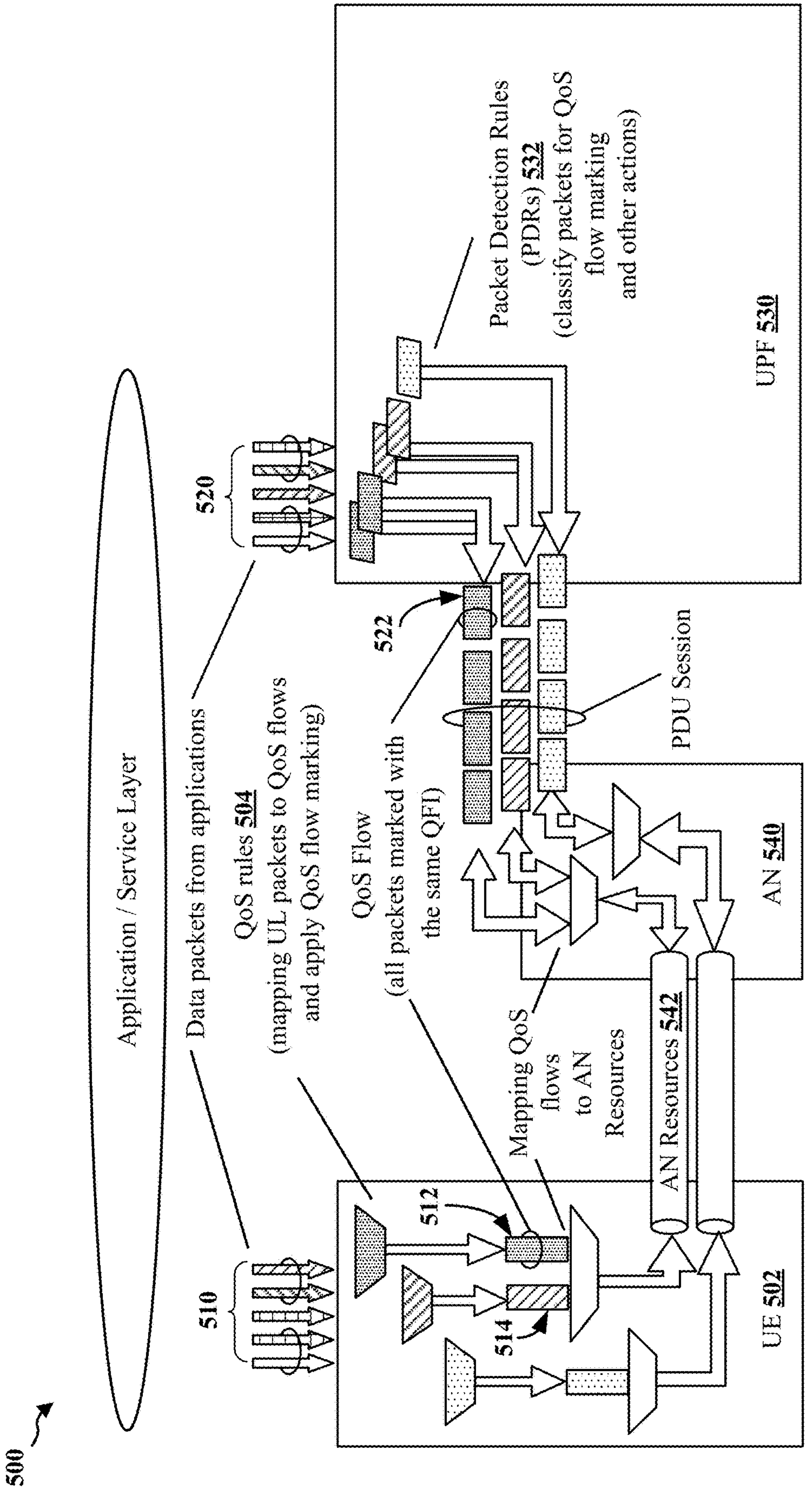
FIG. 5 is a diagram illustrating example mappings of quality of service (QOS) flows across the bears.

FIG. 5 is a diagram 500 illustrating an example mapping of QoS flows across the bearers. As shown in FIG. 5, various QoS flows may be mapped based on different QoS requirements across the radio bearers. For example, in downlink (DL), incoming data packets 520 may be classified by the user plane function (UPF) 530 based on the packet detection rules (PDRs) 532, which is a set of criteria or algorithms used to identify the beginning and end of data packets (e.g., data packets 520) transmitted over a wireless network. The access network (AN) 540 may bind QoS flows (e.g., QoS flow 522) to AN resources (e.g., AN resources 542). The AN resources may include, for example, data radio bearers. Similarly, in uplink (UL), the UE 502 may classify UL packets (e.g., packets 510) based on the QoS rules 504, and bind the QoS flows (e.g., QoS flows 512, 514) to the AN resources (e.g., AN resources 542). In some examples, distinguishing between the bearers that are part of a single slice (e.g., a segment of a wireless network operating independently to meet specific service or performance requirements) or different slices may facilitate the support for End-to-End (E2E) resource management to meet the service level agreements (SLA).

Figure 6:
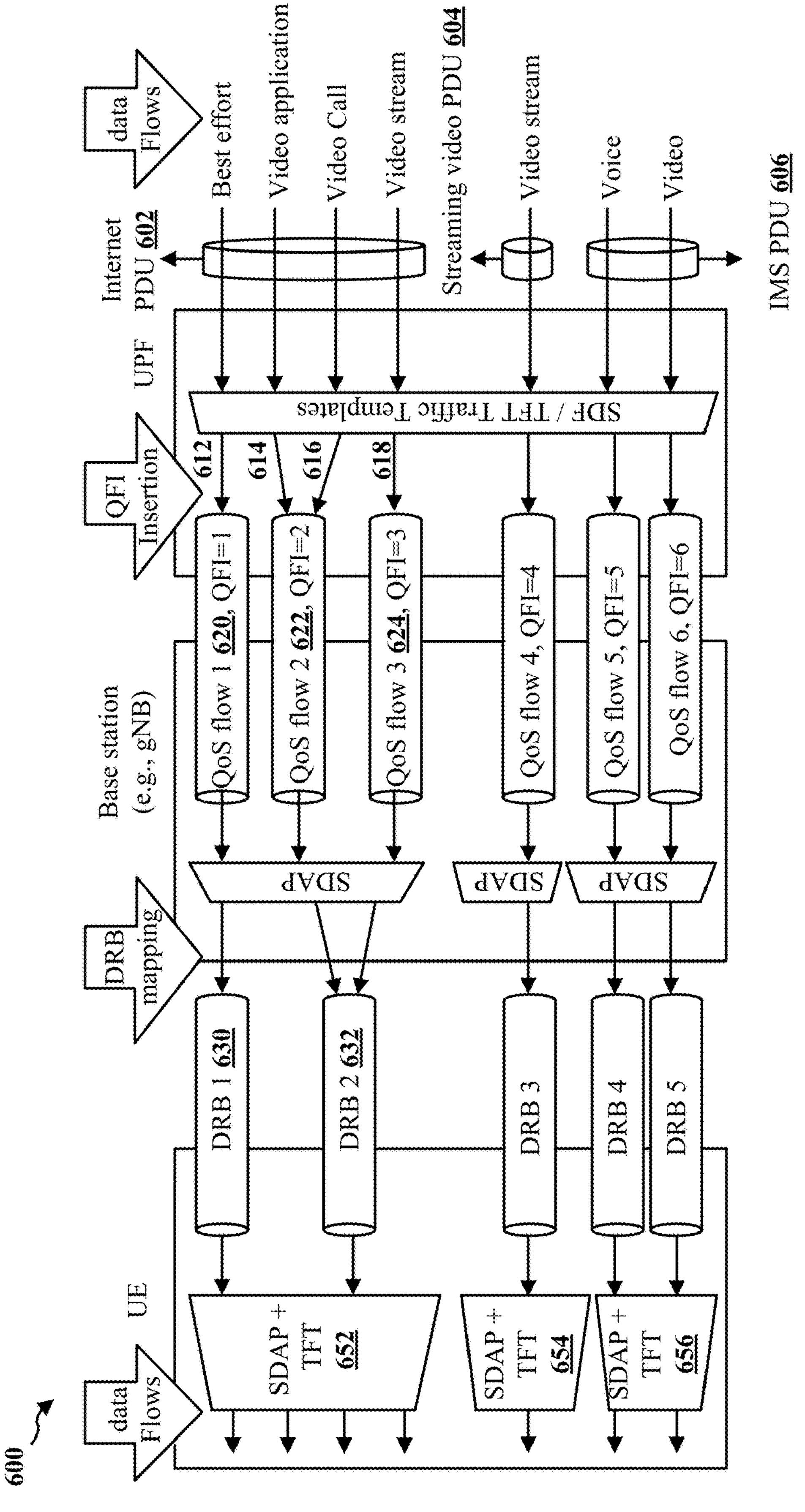
FIG. 6 is a diagram illustrating example mappings among different flows, Radio Bearers (DRBs), Service Data Adaption Protocols (SDAPs), and protocol data unit (PDU) sessions.

FIG. 6 is a diagram 600 illustrating an example mapping among different flows, DRBs, SDAPs, and PDU sessions. In FIG. 6, different PDU sessions, such as Internet PDU session 602, streaming video PDU session 604, or IP multimedia subsystem (IMS) PDU session 606, may have different QoS requirements. Each PDU session may have its own service data flows (SDFs). For example, Internet PDU session 602 may have four SDFs (e.g., SDFs 612, 614, 616, and 618). One or multiple SDFs may be mapped to the same QoS flow. For example, SDFs 614 and 616 may be mapped to QoS flow 2 622, and SDF 618 may be mapped to QoS flow 3 624. The QoS flows may be mapped to data radio bearers (DRBs), and one or multiple QoS flows may be mapped to one DRB. For example, as shown in FIG. 6, QoS flow 1 620 may be mapped to DRB 1 630, and QoS flow 2 622 and QoS flow 3 624 may be mapped to the same DRB (DRB 2 632). As shown in FIG. 5, QoS flows 512 and 514 may be mapped to AN resources 542 (which may be DRBs). As shown in FIG. 6, multiple DRBs (such as a default DRB and optional dedicated DRBs) may be mapped on the same PDU session. For example, DRB 1 630 and DRB 2 632 may be mapped to the Internet PDU session 602. One SDAP entity may correspond to one PDU session. For example, one SDAP entity (e.g., SDAP and traffic flow template (SDAP+TFT) 652) may correspond to the Internet PDU session 602, another SDAP entity (e.g., SDAP+TFT 654) may correspond to the streaming video PDU session 604, and a third SDAP entity (e.g., SDAP+TFT 656) may correspond to the IMS PDU session 606. Due to the various mapping relationships between the DRBs, QoS flows, SDAP entities, and PDU sessions, having finer control and management over the data transmission (e.g., through BSR triggers on individual DRBs) is beneficial.

A wireless communication system may support various types of traffic. Among other types of traffic, a wireless communication system may support XR traffic. XR traffic may refer to wireless communications for technologies such as virtual reality (VR), mixed reality (MR), and/or augmented reality (AR). VR may refer to technologies in which a user is immersed in a simulated experience that is similar or different from the real world. A user may interact with a VR system through a VR headset or a multi-projected environment that generates realistic images, sounds, and other sensations that simulate a user's physical presence in a virtual environment. MR may refer to technologies in which aspects of a virtual environment and a real environment are mixed. AR may refer to technologies in which objects residing in the real world are enhanced via computer-generated perceptual information, sometimes across multiple sensory modalities, such as visual, auditory, haptic, somatosensory, and/or olfactory. An AR system may incorporate a combination of real and virtual worlds, real-time interaction, and accurate three-dimensional registration of virtual objects and real objects. In an example, an AR system may overlay sensory information (e.g., images) onto a natural environment and/or mask real objects from the natural environment. XR traffic may include video data and/or audio data. XR traffic may be transmitted by a base station and received by a UE or the XR traffic may be transmitted by a UE and received by a base station.

Figure 7:
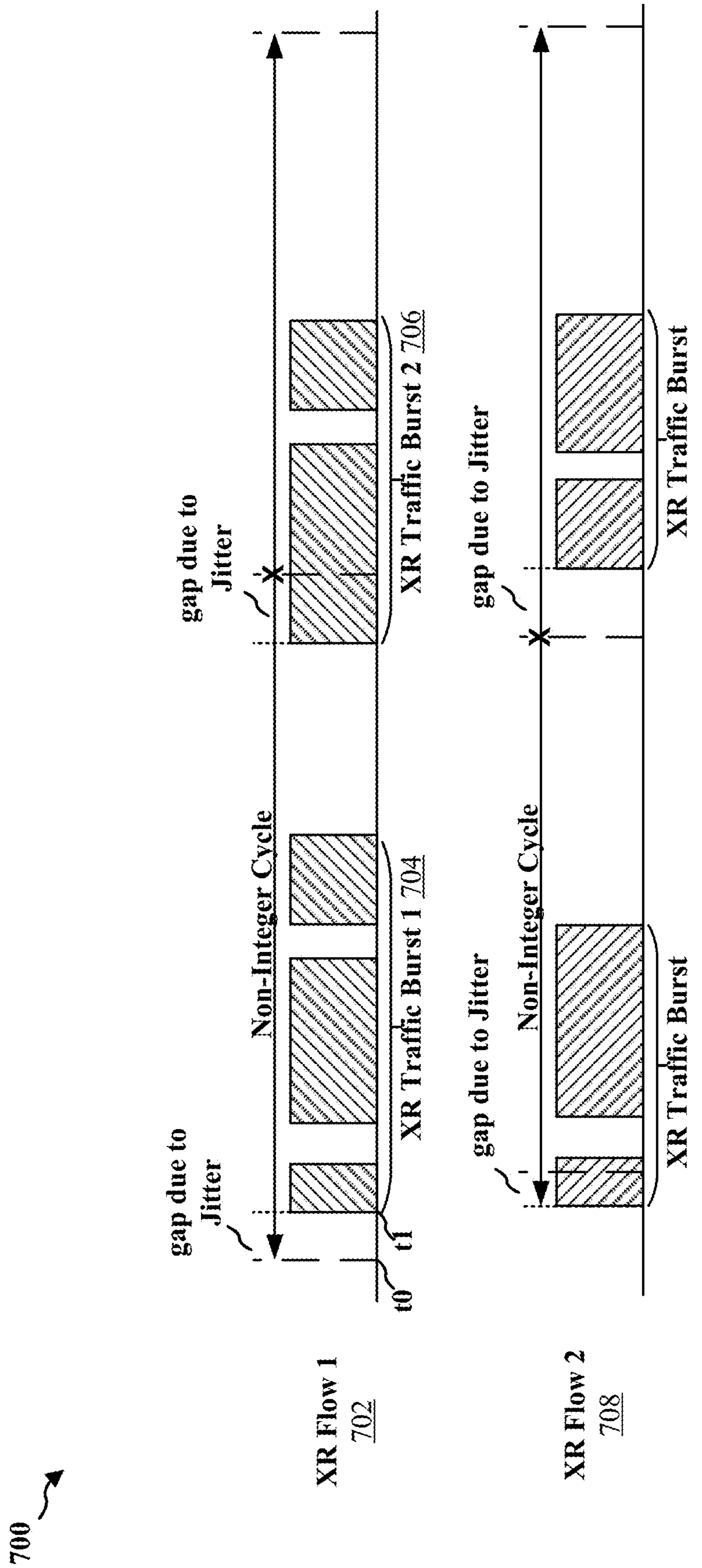
FIG. 7 is a diagram illustrating an example of extended reality (XR) traffic flows.

XR traffic may arrive in periodic traffic bursts ("XR traffic bursts"). An XR traffic burst may vary in a number of packets per burst and/or the size of each packet in the burst. The diagram 700 in FIG. 7 illustrates a first XR flow 702 that includes a first XR traffic burst 704 and a second XR traffic burst 706. As illustrated in the diagram 700, the traffic bursts may include different numbers of packets, e.g., the first XR traffic burst 704 is shown with three packets (represented as rectangles in the diagram 700) and the second XR traffic burst 706 is shown with two packets. Furthermore, as illustrated in the diagram 700, the three packets in the first XR traffic burst 704 and the two packets in the second XR traffic burst 706 may vary in size, that is, packets within the first XR traffic burst 704 and the second XR traffic burst 706 may include varying amounts of data.

XR traffic bursts may arrive at non-integer periods (i.e., in a non-integer cycle). The periods may be different than an integer number of symbols, slots, etc. In an example, for 60 frames per second (FPS) video data, XR traffic bursts may arrive in 1/60=16.67 ms periods. In another example, for 120 FPS video data, XR traffic bursts may arrive in 1/120=8.33 ms periods.

Arrival times of XR traffic may vary. For example, XR traffic bursts may arrive and be available for transmission at a time that is earlier or later than the time at which a UE (or a base station) expects the XR traffic bursts. The variability of the packet arrival relative to the period (e.g., 16.76 ms period, 8.33 ms period, etc.) may be referred to as "jitter." In an example, jitter for XR traffic may range from −4 ms (earlier than expected arrival) to +4 ms (later than expected arrival). For instance, referring to the first XR flow 702, a UE may expect a first packet of the first XR traffic burst 704 to arrive at time t0, but the first packet of the first XR traffic burst 704 arrives at time t1.

XR traffic may include multiple flows that arrive at a UE (or a base station) concurrently with one another (or within a threshold period of time). For instance, the diagram 700 includes a second XR flow 708. The second XR flow 708 may have different characteristics than the first XR flow 702. For instance, the second XR flow 708 may have XR traffic bursts with different numbers of packets, different sizes of packets, etc. In an example, the first XR flow 702 may include video data and the second XR flow 708 may include audio data for the video data. In another example, the first XR flow 702 may include intra-coded picture frames (I-frames) that include complete images and the second XR flow 708 may include predicted picture frames (P-frames) that include changes from a previous image.

In a BSR configuration, a single set of BSR triggering conditions may correspond to one MAC entity. The set of BSR triggering conditions may be used for each of the LCGs, DRBs, PDU sessions, and various application flows. The set of BSR triggering conditions may correspond to the BSR being a short, long, or truncated BSR, but does not correspond to the reason that a BSR is triggered (e.g., whether a BSR is triggered due to new data arrival, the significant change of the data amount to be transmitted, or as a periodic BSR transmission). Some timing mechanisms may use a timer to monitor the transmission process of the data associated with an application, and a device may react accordingly (e.g., discard the transmission or request a retransmission) if the transmission delay is too long and extends longer than a threshold amount of time. For example, a "timer discard" may correspond to discarding a transmission based on a timer running at the PDCP layer. If a PDU waits at the PDCP layer for longer than Timer Discard, it will be discarded.

Aspects presented herein provide the capability to enable various triggers at a PDU set level (rather than the PDU level). In this disclosure, a "PDU set" may refer to a group of PDUs associated with an application frame (e.g., a video frame). The set of BSR triggering conditions does not cover the physical layer (PHY) aspects, for example. In BSR triggering mechanisms based on the timer discard mechanism, even with a complete Hybrid Automatic Repeat Request (HARQ) Block Error Rate (BLER), when the BSR is already encoded in a MAC TB, the retransmit (ReTx) BSR timer logic may stop further BSR transmission (e.g., a retransmission of a BSR) to the network for a period of time, which may prevent the BSR information from being transmitted to the network in a timely manner. When a PDU set is transmitted, if the HARQ fails or experiences delays due to the retransmission (which may result in the PDU Set Delay Budget (PSDB) requirement being missed), the BSR may be stopped or held due to the retransmission BSR. Hence, even though some grants (e.g., transmission resources) may come in association with an earlier BSR, when the PSDB requirement is missed due to physical (PHY) layer issues, there may be no additional BSR trigger to the network. For example, when a timer discard happens (e.g., due to the transmission delay) and some PDU sets are discarded, which may impact the QoS requirements, the BSR will not be triggered. Under the current BSR triggering mechanisms, the BSR trigger happens when higher-priority DRB data arrives, but not for the data on the same DRB, and there is no distinction of higher or lower priority flow within the DRB that is considered. Additionally, after the BSR information is sent to the network at the instance a BSR triggering condition is met, the BSR may be changed by the time the grant (e.g., transmission resources) starts coming. In that case, a UE may not send an updated BSR until a condition is met (e.g., one of the "Regular or Padding BSR" conditions is met) and the retransmission BSR (ReTxBSR) timer is not running.

The present disclosure provides for signaling enhancements for BSR triggering conditions. In some aspects, the signaling enhancements may include additional BSR triggering conditions to enable the timely availability of buffer status information for the base station. In some example aspects, these additional BSR triggering conditions may be introduced for XR-specific applications.

In some aspects, the BSR triggering conditions may be PDU set specific. In XR applications, the communication of PDUs in a PDU set may have certain requirements, such as the PDU Set Delay Budget (PSDB) requirement and the PDU Set Error Rate (PSER) requirement. For example, an example PSDB may be 100 milliseconds and an example PSER may be 1%, meaning that the entire PDU set is to be transmitted within 100 milliseconds with an error rate not more than 1%.

In some aspects, the BSR triggering conditions may be related to the latency condition of a PDU set transmission. In one example, the triggering conditions may be related to an elapsed time from the beginning of a PDU set transmission. For example, if an elapsed time since the beginning of a PDU set transmission is greater than a first elapsed threshold and no grant (e.g., transmission resources) has been received yet, a BSR transmission may be triggered. In another example, the triggering conditions may be related to an elapsed time from the reception of the last grant (e.g., the last transmission that provides transmission resources). For example, if an elapsed time since the reception of the last grant (e.g., the last transmission that provides transmission resources) is greater than a second elapsed threshold, and no new grant (e.g., transmission resources) has been received yet, a BSR transmission may be triggered. In another example, the triggering conditions may be related to the experienced latency of the PDU set transmission. For example, if the experienced latency of a PDU set transmission is longer than a third threshold (or the ratio of the experienced latency to the PSDB is larger than a ratio threshold), a BSR transmission may be triggered. In these examples, when the transmission of a PDU set is experiencing a delay more than a specific threshold from the beginning of the PDU set's arrival into a modem or from the reception of the last grant, a BSR may be triggered to request a further grant (e.g., additional transmission resource) from the network, which may help to get the grant (e.g., transmission resource) within the PSDB to ensure the PDU set is delivered successfully within the PSDB from the flow perspective.

In some examples, grants (e.g., transmission resources) may be received periodically and the time interval between adjacent grants (e.g., adjacent transmissions that provide transmission resources) may be less than the second elapsed threshold. In those cases, the BSR triggering conditions based on the elapsed time since the beginning of a PDU set transmission and the elapsed time since the reception of the last grant (e.g., the last transmission that provides transmission resources) are not met, and no BSR may be triggered based on these triggering conditions. However, in those cases, the overall latency may exceed the PSDB. Hence, sending the BSR based on the experienced latency may help the network increase the grant (e.g., transmission resources) to, for example, meet the PSDB requirement.

In some aspects, new BSR types may be provided, and a BSR may include additional bits or fields indicating the corresponding BSR types. The BSR types may indicate the reason the BSR is triggered. For example, the reason may be that the elapsed time from the beginning of a PDU set transmission or the elapsed time since the reception of the last grant is longer than the corresponding threshold. The additional bits or fields in the BSR may be helpful for the network to react to the scheduling perspective (e.g., changing the grant pattern). For example, if the BSR type indicates that the BSR is triggered because the elapsed time since the reception of the last grant is longer than the corresponding threshold, the network may increase the frequency of transmitting the grant. A new BSR type, for example, a "latency" type, may be provided as an additional type. The BSR triggered by the latency condition of a PDU set transmission may have an indication of the "type of latency" as additional bits/reasons. This information may help the network to react to the scheduling perspective accordingly.

In some aspects, the BSR triggering conditions may be related to the number of HARQ failures or the overall HARQ conclusion delay. For example, when the number of the experienced previous HARQ failures, or the experienced overall HARQ conclusion delay is greater than a corresponding threshold, a BSR may be triggered. In one example, a BSR may be triggered if the number of HARQ failures is greater than two, or the overall HARQ conclusion delay is greater than 100 milliseconds.

In some aspects, the BSR triggering conditions may be related to the timer discard (e.g., discard of one or more PDUs based on the expiration of a timer) for any PDU in the PDU set. When the timer discard happens, and some PDUs are discarded, the QoS requirements or the PSER may be affected. Hence, having additional BSR triggering mechanisms to indicate the relevant information to the network may help the network to better manage the PDU set transmission (for example, by increasing the grant to address the PSDB or conserving the MCS to improve the PSER). A new BSR type, for example, a "PHY" type, may be provided as an additional type. The BSR triggered by the PHY issues related to a PDU set transmission (e.g., the number of the experienced previous HARQ failures) may have an indication of, for example, a "type of drop" as additional bits/reasons that indicate a reason that the PDU(s) were dropped. This information may help the network to react to the received information with more effective scheduling for the UE.

In some aspects, the BSR triggering conditions may have a flow level distinction. For example, the BSR triggering conditions may be related to new PDU sets (on the same priority or higher priority flow, on the same flow or different flow) arriving on the same DRB of the current PDU set. The BSR triggering conditions may also be related to new PDU sets arrived on different DRBs of the same priority, which may belong to the same PDU session or different PDU sessions of the current PDU set.

As multiple flows of different priorities and QoS requirements may be multiplexed on the same DRB, when high priority flow data (compared to previous BSR instances) arrives, additional BSR may be sent to the network to help the network better arrange the resource from the PSDB and PSER perspectives.

For example, on a given flow, the arrival of a higher priority PDU set (compared to previous PDU sets) or the arrival of the same priority flow on the bearer may indicate that the PDU set associated with the previous frame may be late. Hence, a trigger for the BSR may be sent.

Even if the data came on different DRBs of the same priority, if the PDU session type is different (e.g., IPv4, IPv6, IPv4v6, Ethernet (ETH), Unspecified) or the PDU session slice type is different (e.g., eMBB, URLLC, mMTC, etc.), a BSR may be triggered to indicate the presence of data as some of the PDU sessions may be more sensitive to PSDB (e.g., ETH, URLLC) than others.

As all the above scenarios may impact the PSDB, PSER, additional BSR triggers related to these scenarios may be provided to indicate relevant information to the network for the network to better manage the PUD set transmission. For example, the network may increase the grant to address PSDB or conserve MCS to improve the PSER. A New BSR type, for example, a type based on "flow" may be provided as an additional type. The BSR triggered by the flow level issues related to a PDU set transmission (e.g., the arrival of new PDU sets on the DRB) may have an indication of, for example, "type of flow" as additional bits/reasons. This information may help the network to react to the scheduling perspective accordingly.

In some aspects, the BSR triggering conditions may be related to a change of BSR. When the BSR has changed between the BSR report time and the time of receiving the first grant, a new BSR may be triggered, even with the current data not being fully drained. In one example, the first BSR may report a requested data amount of 10K, and the grant may come after 20 ms. Meanwhile, after the first BSR was sent, 4K of data may be discarded due to, for example, a timer discard on the same DRB. In that case, without additional BSR, the network may assume 10K is the requested data amount and schedule the grant accordingly (for example, the network may schedule 5K of grant at t=0 and another 5K of grant at t=10 ms). However, the actual data amount before the first grant is 6K, and 4K of grant may be wasted if the network is not notified of the updated data amount. Hence, if the BSR has changed before the first grant is received, a new BSR may be reported in the first MAC TB (or every MAC TB in which this change happened) to inform the network of the updated BSR. For example, with the new BSR report, the network may schedule 1K (instead of 5K) of data at t=10 ms to avoid wasting transmission resources.

In some aspects, the network may schedule in a way that the total amount of data indicated by the BSR may be spread over time. Hence, having the updated BSR at the time of the first grant or periodically may help the network to adjust the scheduling mechanisms, for example, by increasing or decreasing the grant, to meet the PSDB. For example, the network may increase the grant if the BSR increases or decrease the grant if BSR is reduced due to, for example, a timer discard.

As the BSR update may impact the PSDB, PSER, having additional BSR trigger mechanisms to indicate the BSR update information to the network may help the network to better manage the PDU set transmission, for example, by increasing the grant to address the PSDB or conserving the MCS to improve the PSER.

A new BSR type, for example, an "updated" type, may be provided as an additional type. The BSR triggered by the change of BSR may have an indication of the "type of update" as additional bits/reasons. This information may help the network to react to the scheduling perspective accordingly.

Figure 8:
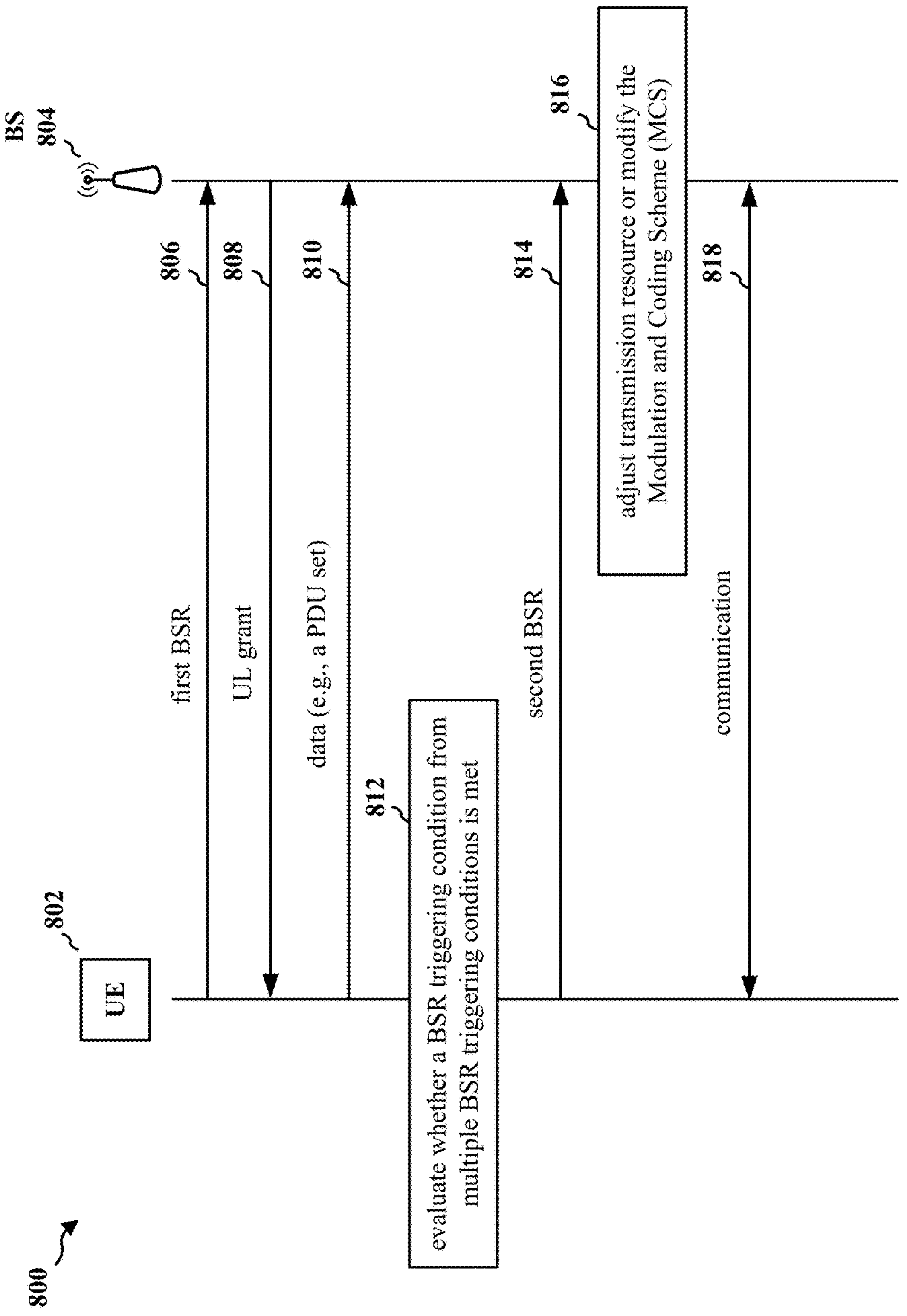
FIG. 8 is a call flow diagram illustrating a method of wireless communication in accordance with various aspects of the present disclosure.

FIG. 8 is a call flow diagram 800 illustrating a method of wireless communication in accordance with various aspects of this present disclosure. Although aspects are described for a base station 804, the aspects may be performed by a base station in aggregation and/or by one or more components of a base station 804 (e.g., a CU 110, a DU 130, and/or an RU 140).

As shown in FIG. 8, a UE 802 may send, at 806, a first BSR to the base station 804. The first BSR may request a UL grant from the base station 804 for the UE to transmit UL data.

At 808, the base station 804 may, in response to the first BSR, allocate the corresponding UL grant to the UE 802.

At 810, when the UE 802 receives the UL grant from the base station 804, the UE 802 may start transmitting the data to the base station 804 with the UL grant. In some examples, the data may be a PDU set.

At 812, based on the transmission condition of the data, the UE 802 may evaluate whether a BSR triggering condition from multiple BSR triggering conditions is met. The multiple BSR triggering conditions may be based on one or more of: a latency condition of the PDU set; a condition relating to dropped packets (or PDUs) in the PDU set; a flow condition of the PDU set; or an update condition of the PDU set. For example, the UE 802 may evaluate whether there is a delay on receiving the UL grant from the base station 804, or whether there are any HARQ failures associated with the data transmission, or whether there is another PDU set arriving on the same DRB.

At 814, if one BSR triggering condition is met, the UE 802 may send a second BSR to the base station 804. For example, if the UE 802 determines that the elapsed time since the last transmission resource received from the base station 804 is longer than a corresponding threshold, the UE 802 may send, at 814, a second BSR. The second BSR may include the information for the reason the second BSR is triggered.

At 816, based on the received second BSR, the base station 804 may adjust the transmission scheme to the UE 802. For example, the base station may adjust (e.g., increase or decrease) the transmission resource for the UE or modify the MCS for the transmission. For example, if the second BSR indicates that the reason for the BSR is the elapsed time since the last transmission resource received from the base station 804 is longer than a corresponding threshold, the base station 804 may reduce the interval between the grant allocations to the UE 802.

At 818, the UE 802 may continue communicating with the base station 804 based on the BSR. For example, if the base station 804 has adjusted the transmission scheme (e.g., adjusted the transmission resource or modified the MCS) at 816 based on the second BSR received at 814, the UE 802 and the base station 804 may continue the communication based on the adjusted transmission scheme.

Figure 9:
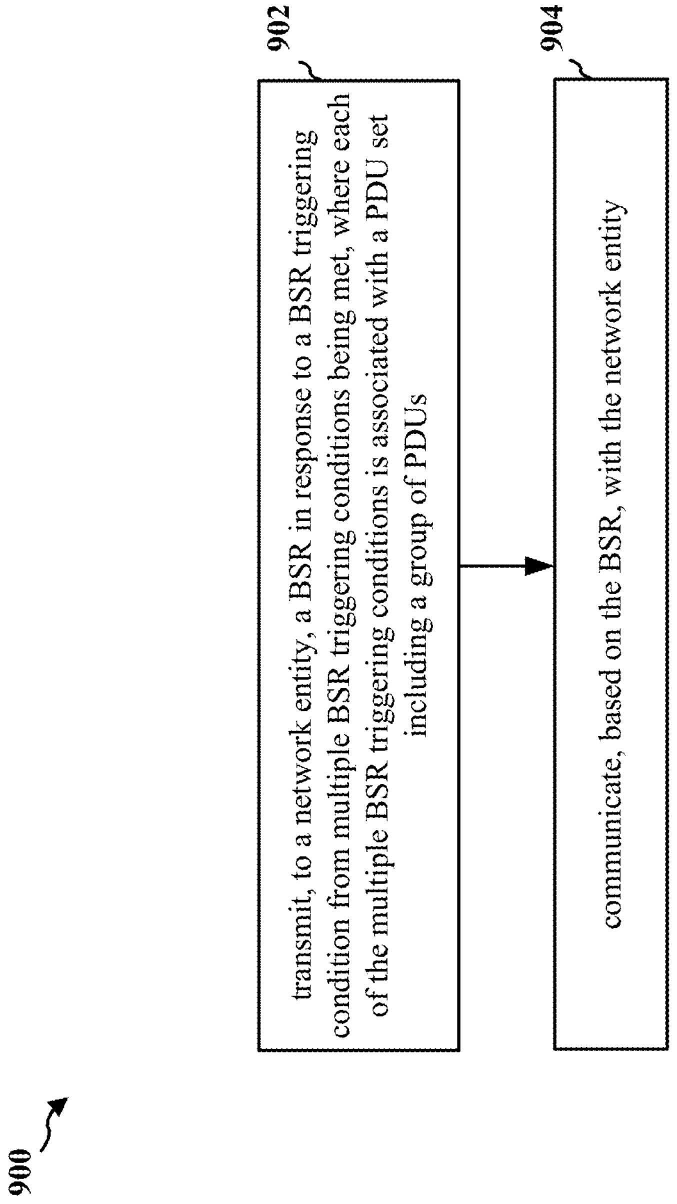
FIG. 9 is a flowchart illustrating methods of wireless communication at a UE in accordance with various aspects of the present disclosure.

FIG. 9 is a flowchart 900 illustrating methods of wireless communication at a UE in accordance with various aspects of the present disclosure. The method may be performed by a UE. The UE may be the UE 104, 350, 802, or the apparatus 1304 in the hardware implementation of FIG. 13. The method provides multiple BSR triggering conditions based on various scenarios in data transmission. The method allows the BSR information to be more readily available to the network and enables a more efficient resource allocation. Thus, it improves the efficiency of wireless communication.

As shown in FIG. 9, at 902, the UE may transmit, to a network entity, a BSR in response to a BSR triggering condition from multiple BSR triggering conditions being met, where each of the multiple BSR triggering conditions is associated with a PDU set including a group of PDUs. In some aspects, the group of PDUs may be associated with an application frame. The network entity may be a base station, or a component of a base station, in the access network of FIG. 1 or a core network component (e.g., base station 102, 310; base station 804; or the network entity 1302 in the hardware implementation of FIG. 13). FIG. 8 illustrates various aspects of the steps in connection with flowchart 900. For example, referring to FIG. 8, the UE 802 may transmit, at 810, to a network entity (base station 804), a BSR in response to a BSR triggering condition from multiple BSR triggering conditions being met (at 812). Each of the multiple BSR triggering conditions is associated with a PDU set (which the UE 802 starts transmitting at 810) including a group of PDUs. In some examples, the group of PDUs may be associated with an application frame. In some aspects, 902 may be performed by the BSR triggering component 198.

At 904, the UE may communicate, based on the BSR, with the network entity. For example, referring to FIG. 8, the UE 802 may communicate, at 818, based on the BSR, with the network entity (base station 804). In some aspects, 904 may be performed by the BSR triggering component 198.

Figure 10:
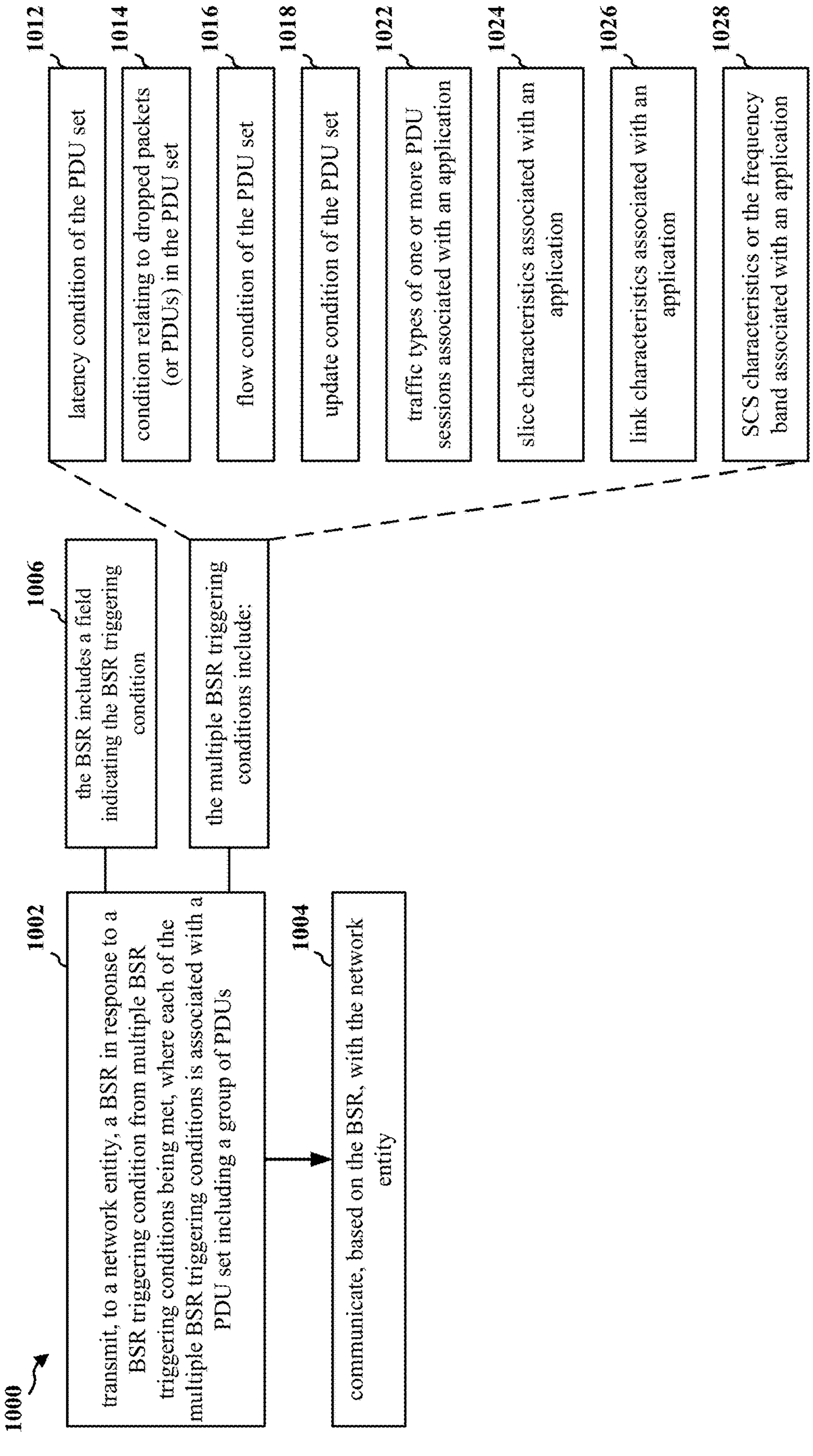
FIG. 10 is a flowchart illustrating methods of wireless communication at a UE in accordance with various aspects of the present disclosure.

FIG. 10 is a flowchart 1000 illustrating methods of wireless communication at a UE in accordance with various aspects of the present disclosure. The method may be performed by a UE. The UE may be the UE 104, 350, 802, or the apparatus 1304 in the hardware implementation of FIG. 13. The method provides multiple BSR triggering conditions based on various scenarios in data transmission. The method allows the BSR information to be more readily available to the network and enables a more efficient resource allocation. Thus, it improves the efficiency of wireless communication.

As shown in FIG. 10, at 1002, the UE may transmit, to a network entity, a BSR in response to a BSR triggering condition from multiple BSR triggering conditions being met, where each of the multiple BSR triggering conditions is associated with a PDU set including a group of PDUs. In some aspects, the group of PDUs may be associated with an application frame. The network entity may be a base station, or a component of a base station, in the access network of FIG. 1 or a core network component (e.g., base station 102, 310; base station 804; or the network entity 1302 in the hardware implementation of FIG. 13). FIG. 8 illustrates various aspects of the steps in connection with flowchart 1000. For example, referring to FIG. 8, the UE 802 may transmit, at 810, to a network entity (base station 804), a BSR in response to a BSR triggering condition from multiple BSR triggering conditions being met (at 812). Each of the multiple BSR triggering conditions is associated with a PDU set (which the UE 802 starts transmitting at 810) including a group of PDUs. In some examples, the group of PDUs may be associated with an application frame. In some aspects, 1002 may be performed by the BSR triggering component 198.

At 1004, the UE may communicate, based on the BSR, with the network entity. For example, referring to FIG. 8, the UE 802 may communicate, at 818, based on the BSR, with the network entity (base station 804). In some aspects, 1004 may be performed by the BSR triggering component 198.

In some aspects, as shown in FIG. 10, the multiple BSR triggering conditions may include one or more of: a latency condition of the PDU set (1012); a condition relating to dropped packets (or PDUs) in the PDU set (1014); a flow condition of the PDU set (1016); or an update condition of the PDU set (1018). For example, referring to FIG. 8, when the UE 802 evaluates, at 812, whether one BSR from multiple BSR triggering conditions is met, the multiple BSR triggering conditions may include one or more of: a latency condition of the PDU set; a condition relating to dropped packets (or PDUs) in the PDU set; a flow condition of the PDU set; or an update condition of the PDU set.

In some aspects, at 1006, the BSR may include a field indicating the BSR triggering condition. For example, referring to FIG. 8, the BSR (e.g., the second BSR at 814) may include a field indicating the BSR triggering condition (e.g., the BSR triggering condition that is evaluated to be met at 812).

In some aspects, the BSR triggering condition may be based on a latency condition of the PDU set (1012). The latency condition may be based on one or more of: a first elapsed time since the beginning of the PDU set; a second elapsed time since the last transmission resource received from the network entity associated with the PDU set; or a ratio of the first elapsed time to a PSDB. For example, referring to FIG. 8, the latency condition may be based on one or more of: a first elapsed time since the beginning of the PDU set transmission (at 810); a second elapsed time since the last transmission resource received from the network entity (base station 804) associated with the PDU set (at 808); or a ratio of the first elapsed time to a PSDB.

In some aspects, the BSR triggering condition may be based on a condition relating to dropped packets (or PDUs) in the PDU set (1014). The condition relating to dropped packets (or PDUs) in the PDU set may be based on one or more of: a number of Hybrid Automatic Repeat Request (HARQ) failures associated with the PDU set; an overall HARQ conclusion delay; or a number of timers discarded for the PDUs in the PDU set. For example, referring to FIG. 8, when the UE 802 evaluates, at 812, whether a BSR triggering condition from multiple BSR triggering conditions is met, the BSR triggering condition may be based on a condition relating to dropped packets (or PDUs) in the PDU set (which the UE 802 starts transmitting at 810). The condition relating to dropped packets (or PDUs) in the PDU set may be based on one or more of: a number of Hybrid Automatic Repeat Request (HARQ) failures associated with the PDU set; an overall HARQ conclusion delay; or a number of timers discarded for the PDUs in the PDU set.

In some aspects, the PDU set may be a first PDU set, and the BSR triggering condition is based on a flow condition of the first PDU set (1016). The flow condition may be based on at least one of: a second PDU set arrived on the same DRB of the first PDU set; or a third PDU set arrived on a second DRB different from the DRB of the first PDU set. For example, referring to FIG. 8, when the UE 802 evaluates, at 812, whether a BSR triggering condition from multiple BSR triggering conditions is met, the BSR triggering condition may be based on the flow condition of the first PDU set. The flow condition may be based on at least one of: a second PDU set arrived on the same DRB of the first PDU set; or a third PDU set arrived on a second DRB different from the DRB of the first PDU set.

In some aspects, the first PDU set and the second PDU set may be associated with the same flow or different flows. For example, referring to FIG. 8, different BSR trigger conditions (at 812) may be specified, depending on whether the first PDU set and the second PDU set are associated with the same flow or different flows.

In some aspects, the first PDU set and the second PDU set may have the same priority or different priorities. For example, referring to FIG. 8, different BSR trigger conditions (at 812) may be specified, depending on whether the first PDU set and the second PDU set may have the same priority or different priorities.

In some aspects, the first PDU set and the third PDU set may be associated with the same PDU session or different PDU sessions. For example, referring to FIG. 8, different BSR trigger conditions (at 812) may be specified, depending on whether the first PDU set and the third PDU set are associated with the same PDU session or different PDU sessions.

In some aspects, the first PDU set and the third PDU set may have the same priority or different priorities. For example, referring to FIG. 8, different BSR trigger conditions (at 812) may be specified, depending on whether the first PDU set and the third PDU set have the same priority or different priorities.

In some aspects, the BSR triggering condition may be based on an update condition of the PDU set (1018). The update condition may be based on: an increase or a decrease of data associated with the BSR from a BSR report time of the BSR to a receiving time for receiving a first grant associated with the BSR. For example, referring to FIG. 8, when the UE 802 evaluates, at 812, whether a BSR triggering condition from multiple BSR triggering conditions is met, the BSR triggering condition may be based on the update condition of the PDU set (which the UE 802 starts transmitting at 810). The update condition may be based on: an increase or a decrease of data associated with the BSR from a BSR report time (the time the first BSR was sent at 806) of the BSR to a receiving time for receiving a first grant (at 808) associated with the BSR.

In some aspects, the multiple BSR triggering conditions may be based on traffic types of one or more PDU sessions associated with an application (1022). The traffic types may include one or more of: Internet Protocol version 4 (IPv4), Internet Protocol version 6 (IPv6), IPv4 & IPv6 (IPv4v6), ETH traffic, or unstructured traffic. For example, referring to FIG. 8, when the UE 802 evaluates, at 812, whether a BSR triggering condition from multiple BSR triggering conditions is met, the multiple BSR triggering conditions may be based on traffic types of one or more PDU sessions associated with an application. The traffic types may include one or more of: IPv4, IPv6, IPv4v6, ETH traffic, or unstructured traffic.

In some aspects, the multiple BSR triggering conditions may be based on slice characteristics associated with an application (1024). The slice characteristics may include one or more of: a slice type, a slice ID, or UE route selection policy (URSP) rules. For example, referring to FIG. 8, when the UE 802 evaluates, at 812, whether a BSR triggering condition from multiple BSR triggering conditions is met, the multiple BSR triggering conditions may be based on slice characteristics associated with an application. The slice characteristics may include one or more of: a slice type, a slice ID, or URSP rules.

In some aspects, the multiple BSR triggering conditions may be based on link characteristics associated with an application (1026). The link characteristics may include: a TN connection or an NTN connection. For example, referring to FIG. 8, when the UE 802 evaluates, at 812, whether a BSR triggering condition from multiple BSR triggering conditions is met, the multiple BSR triggering conditions may be based on link characteristics associated with an application. The link characteristics may include: a TN connection or an NTN connection.

In some aspects, the multiple BSR triggering conditions may be based on one or more of: SCS characteristics associated with an application or the frequency band associated with the application (1028). The frequency band may include one of: the FR1 frequency band, the FR2 frequency band, or the FR4 frequency band. For example, referring to FIG. 8, when the UE 802 evaluates, at 812, whether a BSR triggering condition from multiple BSR triggering conditions is met, the multiple BSR triggering conditions may be based on one or more of: SCS characteristics associated with an application or the frequency band associated with the application. The frequency band may include one of: the FR1 frequency band, the FR2 frequency band, or the FR4 frequency band.

Figure 11:
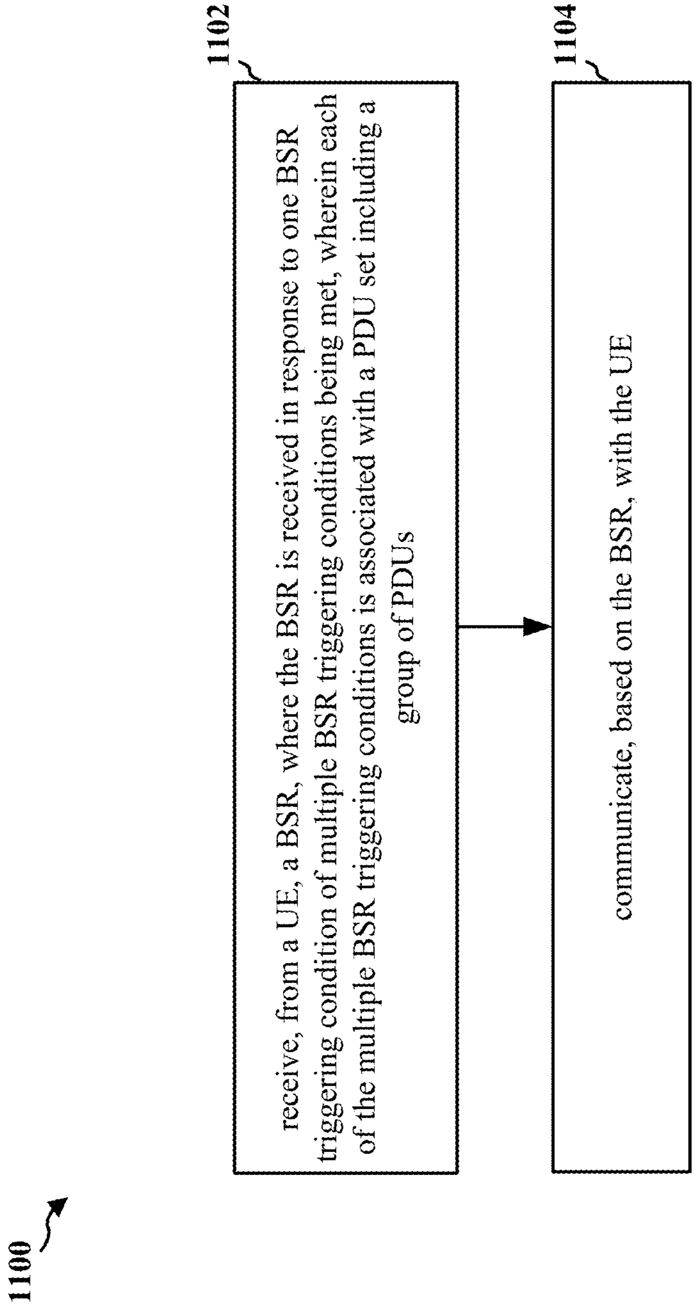
FIG. 11 is a flowchart illustrating methods of wireless communication at a network entity in accordance with various aspects of the present disclosure.

FIG. 11 is a flowchart 1100 illustrating methods of wireless communication at a network entity in accordance with various aspects of the present disclosure. The method may be performed by a network entity. The network entity may be a base station, or a component of a base station, in the access network of FIG. 1 or a core network component (e.g., base station 102, 310, 804; or the network entity 1302 in the hardware implementation of FIG. 13). The method provides multiple BSR triggering conditions based on various scenarios in data transmission. The method allows the BSR information to be more readily available to the network and enables a more efficient resource allocation. Thus, it improves the efficiency of wireless communication.

As shown in FIG. 11, at 1102, the network entity may receive, from a UE, a BSR, where the BSR is received in response to one BSR triggering condition of multiple BSR triggering conditions being met, and each of the multiple BSR triggering conditions is associated with a PDU set including a group of PDUs. In some aspects, the group of PDUs may be associated with an application frame. The UE may be the UE 104, 350, 802, or the apparatus 1304 in the hardware implementation of FIG. 13. FIG. 8 illustrates various aspects of the steps in connection with flowchart 1100. For example, referring to FIG. 8, the network entity (base station 804) may receive, at 814, from a UE 802, a BSR (e.g., the second BSR). The BSR is received in response to one BSR triggering condition of multiple BSR triggering conditions being met (at 812), and each of the multiple BSR triggering conditions is associated with a PDU set (which the UE 802 starts transmitting at 810) including a group of PDUs. In some examples, the group of PDUs may be associated with an application frame. In some aspects, 1102 may be performed by the BSR triggering component 199.

At 1104, the network entity may communicate, based on the BSR, with the UE. For example, referring to FIG. 8, the network entity (base station 804) may communicate, at 818, based on the BSR, with the UE 802. In some aspects, 1104 may be performed by the BSR triggering component 199.

Figure 12:
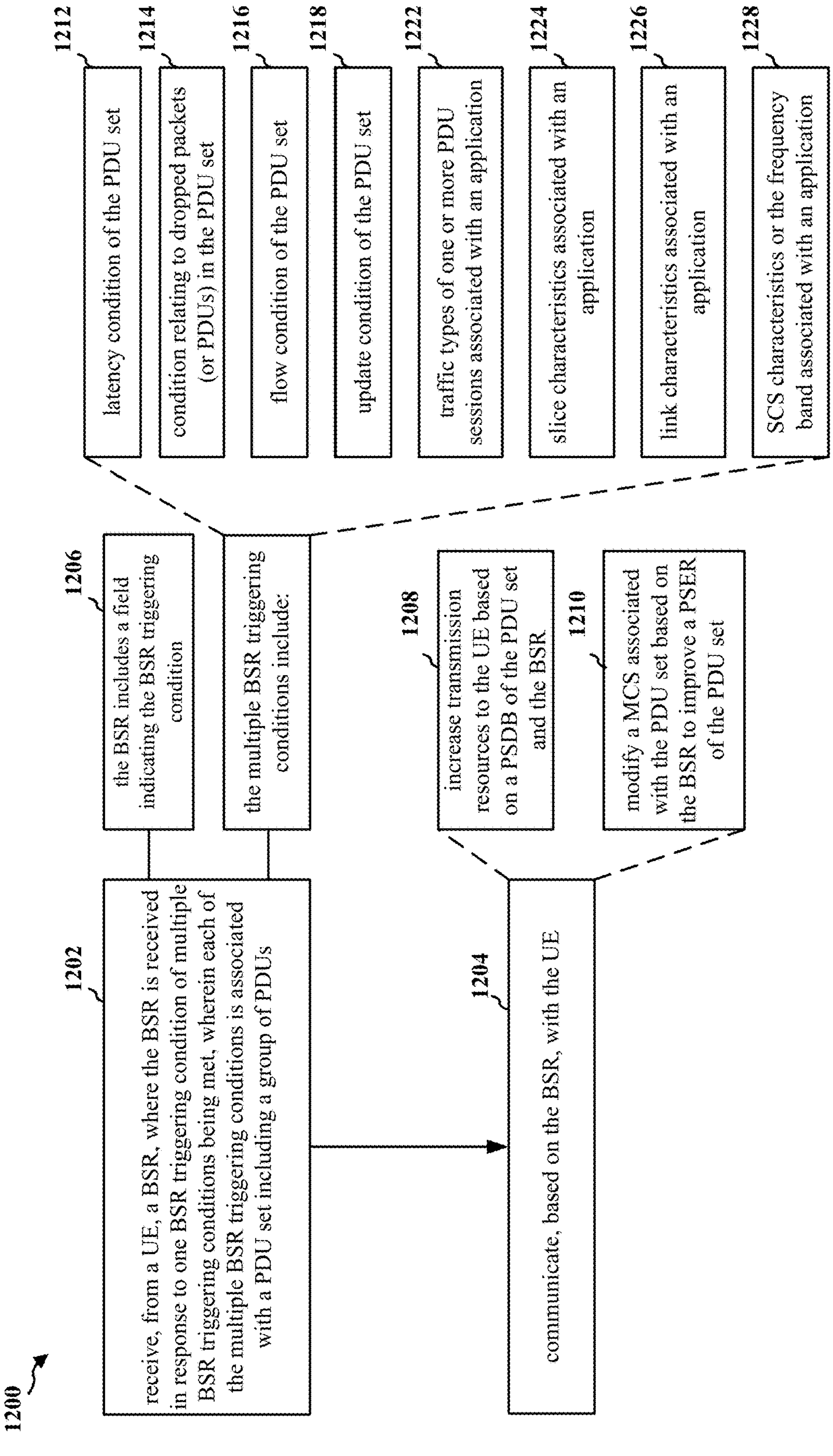
FIG. 12 is a flowchart illustrating methods of wireless communication at a network entity in accordance with various aspects of the present disclosure.

FIG. 12 is a flowchart 1200 illustrating methods of wireless communication at a network entity in accordance with various aspects of the present disclosure. The method may be performed by a network entity. The network entity may be a base station, or a component of a base station, in the access network of FIG. 1 or a core network component (e.g., base station 102, 310, 804; or the network entity 1302 in the hardware implementation of FIG. 13). The method provides multiple BSR triggering conditions based on various scenarios in data transmission. The method allows the BSR information to be more readily available to the network and enables a more efficient resource allocation. Thus, it improves the efficiency of wireless communication.

As shown in FIG. 12, at 1202, the network entity may receive, from a UE, a BSR, where the BSR is received in response to one BSR triggering condition of multiple BSR triggering conditions being met, and each of the multiple BSR triggering conditions is associated with a PDU set including a group of PDUs. In some aspects, the group of PDUs may be associated with an application frame. The UE may be the UE 104, 350, 802, or the apparatus 1304 in the hardware implementation of FIG. 13. FIG. 8 illustrates various aspects of the steps in connection with flowchart 1200. For example, referring to FIG. 8, the network entity (base station 804) may receive, at 814, from a UE 802, a BSR (e.g., the second BSR). The BSR is received in response to one BSR triggering condition of multiple BSR triggering conditions being met (at 812), and each of the multiple BSR triggering conditions is associated with a PDU set (which the UE 802 starts transmitting at 810) including a group of PDUs. In some examples, the group of PDUs may be associated with an application frame. In some aspects, 1202 may be performed by the BSR triggering component 199.

At 1204, the network entity may communicate, based on the BSR, with the UE. For example, referring to FIG. 8, the network entity (base station 804) may communicate, at 818, based on the BSR, with the UE 802. In some aspects, 1204 may be performed by the BSR triggering component 199.

In some aspects, as shown in FIG. 12, the multiple BSR triggering conditions may include one or more of: a latency condition of the PDU set (1212); a condition relating to dropped packets (or PDUs) in the PDU set (1214); a flow condition of the PDU set (1216); or an update condition of the PDU set (1218). For example, referring to FIG. 8, when the UE 802 evaluates, at 812, whether one BSR from multiple BSR triggering conditions is met, the multiple BSR triggering conditions may include one or more of: a latency condition of the PDU set; a condition relating to dropped packets (or PDUs) in the PDU set; a flow condition of the PDU set; or an update condition of the PDU set.

In some aspects, at 1206, the BSR may include a field indicating the BSR triggering condition. For example, referring to FIG. 8, the BSR (e.g., the second BSR at 814) may include a field indicating the BSR triggering condition (e.g., the BSR triggering condition that is evaluated to be met at 812).

In some aspects, the BSR triggering condition may be based on a latency condition of the PDU set (1212). The latency condition may be based on one or more of: a first elapsed time since the beginning of the PDU set; a second elapsed time since the last transmission resource received from the network entity associated with the PDU set; or a ratio of the first elapsed time to a PSDB. For example, referring to FIG. 8, the latency condition may be based on one or more of: a first elapsed time since the beginning of the PDU set transmission (at 810); a second elapsed time since the last transmission resource received from the network entity (base station 804) associated with the PDU set (at 808); or a ratio of the first elapsed time to a PSDB.

In some aspects, the BSR triggering condition may be based on a condition relating to dropped packets (or PDUs) in the PDU set (1214). The condition relating to dropped packets (or PDUs) in the PDU set may be based on one or more of: the number of HARQ failures associated with the PDU set; the overall HARQ conclusion delay; or the number of timers discarded for the PDUs in the PDU set. For example, referring to FIG. 8, when the UE 802 evaluates, at 812, whether a BSR triggering condition from multiple BSR triggering conditions is met, the BSR triggering condition may be based on a condition relating to dropped packets (or PDUs) in the PDU set (which the UE 802 starts transmitting at 810). The condition relating to dropped packets (or PDUs) in the PDU set may be based on one or more of: the number of Hybrid Automatic Repeat Request (HARQ) failures associated with the PDU set; the overall HARQ conclusion delay; or the number of timers discarded for the PDUs in the PDU set.

In some aspects, the PDU set may be a first PDU set, and the BSR triggering condition may be based on a flow condition of the first PDU set (1216). The flow condition may be based on at least one of: a second PDU set arrived on the same DRB of the first PDU set; or a third PDU set arrived on a second DRB different from the DRB of the first PDU set. For example, referring to FIG. 8, when the UE 802 evaluates, at 812, whether a BSR triggering condition from multiple BSR triggering conditions is met, the BSR triggering condition may be based on the flow condition of the first PDU set. The flow condition may be based on at least one of: a second PDU set arrived on the same DRB of the first PDU set; or a third PDU set arrived on a second DRB different from the DRB of the first PDU set.

In some aspects, the first PDU set and the second PDU set may be associated with the same flow or different flows. For example, referring to FIG. 8, different BSR trigger conditions (at 812) may be specified, depending on whether the first PDU set and the second PDU set are associated with the same flow or different flows.

In some aspects, the first PDU set and the second PDU set may have the same priority or different priorities. For example, referring to FIG. 8, different BSR trigger conditions (at 812) may be specified, depending on whether the first PDU set and the second PDU set may have the same priority or different priorities.

In some aspects, the first PDU set and the third PDU set may be associated with the same PDU session or different PDU sessions. For example, referring to FIG. 8, different BSR trigger conditions (at 812) may be specified, depending on whether the first PDU set and the third PDU set are associated with the same PDU session or different PDU sessions.

In some aspects, the first PDU set and the third PDU set may have the same priority or different priorities. For example, referring to FIG. 8, different BSR trigger conditions (at 812) may be specified, depending on whether the first PDU set and the third PDU set have the same priority or different priorities.

In some aspects, the BSR triggering condition may be based on an update condition of the PDU set (1218). The update condition of the PDU set is based on: an increase or a decrease of data associated with the BSR from a BSR report time of the BSR to a receiving time for receiving a first grant associated with the BSR. For example, referring to FIG. 8, when the UE 802 evaluates, at 812, whether a BSR triggering condition from multiple BSR triggering conditions is met, the BSR triggering condition may be based on the update condition of the PDU set (which the UE 802 starts transmitting at 810). The update condition may be based on: an increase or a decrease of data associated with the BSR from a BSR report time (the time the first BSR was sent at 806) of the BSR to a receiving time for receiving a first grant (at 808) associated with the BSR.

In some aspects, to communicate, based on the BSR, with the UE, the network entity may be configured to, at 1208, increase transmission resources to the UE based on a PSDB of the PDU set and the BSR or, at 1210, modify an MCS associated with the PDU set based on the BSR to improve a PSER of the PDU set. For example, referring to FIG. 8, the network entity (base station 804) may be configured to (at 816) increase transmission resources to the UE based on a PSDB of the PDU set and the BSR or modify an MCS associated with the PDU set based on the BSR to improve a PSER of the PDU set. In some aspects, 1208 and 1210 may be performed by the BSR triggering component 199.

In some aspects, the multiple BSR triggering conditions may be based on one or more of: traffic types of one or more PDU sessions associated with an application (1222), where the traffic types include one or more of: IPv4, IPv6, IPv4v6, ETH traffic, or unstructured traffic; slice characteristics associated with an application (1224), where the slice characteristics comprise one or more of: a slice type, a slice ID, or URSP rules; link characteristics associated with an application (1226), where the link characteristics include a TN connection or an NTN connection; SCS characteristics associated with the application or the frequency band associated with the application (1228), where the frequency band includes one of: the FR1 frequency band, the FR2 frequency band, or the FR4 frequency band. For example, referring to FIG. 8, when the UE 802 evaluates, at 812, whether a BSR triggering condition from multiple BSR triggering conditions is met, the multiple BSR triggering conditions may be based on one or more of: traffic types of one or more PDU sessions associated with an application, where the traffic types include one or more of: IPv4, IPv6, IPv4v6, ETH traffic, or unstructured traffic; slice characteristics associated with the application, where the slice characteristics comprise one or more of: a slice type, a slice ID, or URSP rules; link characteristics associated with the application, where the link characteristics include a TN connection or an NTN connection; SCS characteristics associated with the application; or the frequency band associated with the application, where the frequency band includes one of: the FR1 frequency band, the FR2 frequency band, or the FR4 frequency band.

Figure 13:
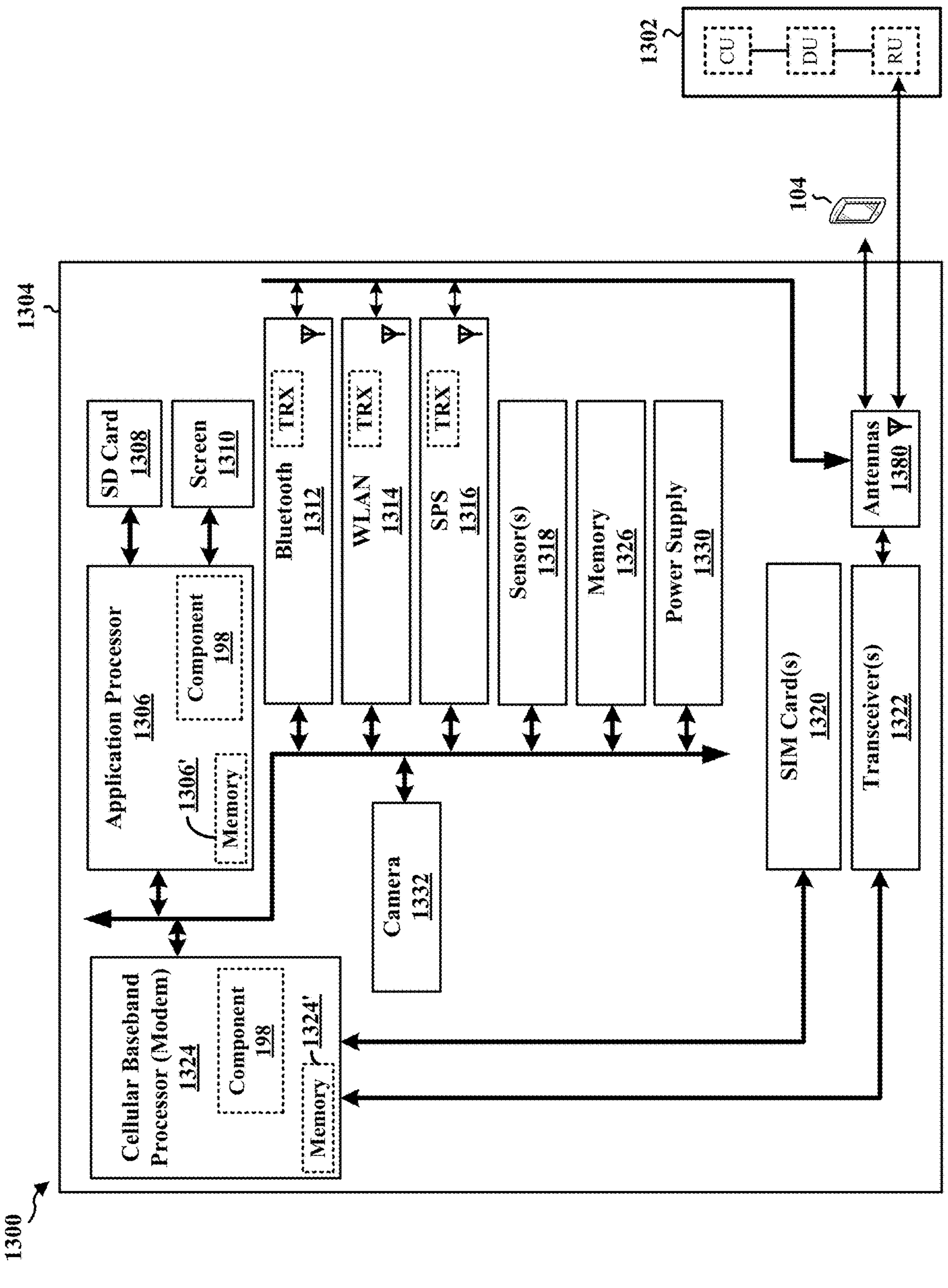
FIG. 13 is a diagram illustrating an example of a hardware implementation for an example apparatus and/or UE.

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include at least one cellular baseband processor (or processing circuitry) 1324 (also referred to as a modem) coupled to one or more transceivers 1322 (e.g., cellular RF transceiver). The cellular baseband processor(s) (or processing circuitry) 1324 may include at least one on-chip memory (or memory circuitry) 1324'. In some aspects, the apparatus 1304 may further include one or more subscriber identity modules (SIM) cards 1320 and at least one application processor (or processing circuitry) 1306 coupled to a secure digital (SD) card 1308 and a screen 1310. The application processor(s) (or processing circuitry) 1306 may include on-chip memory (or memory circuitry) 1306'. In some aspects, the apparatus 1304 may further include a Bluetooth module 1312, a WLAN module 1314, an SPS module 1316 (e.g., GNSS module), one or more sensor modules 1318 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize the antennas 1380 for communication. The cellular baseband processor(s) (or processing circuitry) 1324 communicates through the transceiver(s) 1322 via one or more antennas 1380 with the UE 104 and/or with an RU associated with a network entity 1302. The cellular baseband processor(s) (or processing circuitry) 1324 and the application processor(s) (or processing circuitry) 1306 may each include a computer-readable medium/memory (or memory circuitry) 1324', 1306', respectively. The additional memory modules 1326 may also be considered a computer-readable medium/memory (or memory circuitry). Each computer-readable medium/memory (or memory circuitry) 1324', 1306', 1326 may be non-transitory. The cellular baseband processor(s) (or processing circuitry) 1324 and the application processor(s) (or processing circuitry) 1306 are each responsible for general processing, including the execution of software stored on the computer-readable medium/memory (or memory circuitry). The software, when executed by the cellular baseband processor(s) (or processing circuitry) 1324/application processor(s) (or processing circuitry) 1306, causes the cellular baseband processor(s) (or processing circuitry) 1324/application processor(s) (or processing circuitry) 1306 to perform the various functions described supra. The cellular baseband processor(s) (or processing circuitry) 1324 and the application processor(s) (or processing circuitry) 1306 are configured to perform the various functions described supra based at least in part of the information stored in the memory (or memory circuitry). That is, the cellular baseband processor(s) (or processing circuitry) 1324 and the application processor(s) (or processing circuitry) 1306 may be configured to perform a first subset of the various functions described supra without information stored in the memory and may be configured to perform a second subset of the various functions described supra based on the information stored in the memory. The computer-readable medium/memory (or memory circuitry) may also be used for storing data that is manipulated by the cellular baseband processor(s) (or processing circuitry) 1324/application processor(s) (or processing circuitry) 1306 when executing software. The cellular baseband processor(s) (or processing circuitry) 1324/application processor(s) (or processing circuitry) 1306 may be a component of the UE 350 and may include the at least one memory 360 and/or at least one of the TX processor 368, the RX processor 356, and the controller/processor 359. In one configuration, the apparatus 1304 may be at least one processor chip (modem and/or application) and include just the cellular baseband processor(s) (or processing circuitry) 1324 and/or the application processor(s) (or processing circuitry) 1306, and in another configuration, the apparatus 1304 may be the entire UE (e.g., see UE 350 of FIG. 3) and include the additional modules of the apparatus 1304.

As discussed supra, the component 198 may be configured to transmit, to a network entity, a BSR in response to a BSR triggering condition from multiple BSR triggering conditions being met, where each of the multiple BSR triggering conditions is associated with a PDU set including a group of PDUs associated with a frame of an application; and communicate, based on the BSR, with the network entity. The component 198 may be further configured to perform any of the aspects described in connection with the flowcharts in FIG. 9 and FIG. 10, and/or performed by the UE 802 in FIG. 8. The component 198 may be within the cellular baseband processor(s) (or processing circuitry) 1324, the application processor(s) (or processing circuitry) 1306, or both the cellular baseband processor(s) (or processing circuitry) 1324 and the application processor(s) (or processing circuitry) 1306. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1304 may include a variety of components configured for various functions. In one configuration, the apparatus 1304, and in particular the cellular baseband processor(s) (or processing circuitry) 1324 and/or the application processor(s) (or processing circuitry) 1306, includes means for transmitting, to a network entity, a BSR in response to a BSR triggering condition from multiple BSR triggering conditions being met, where each of the multiple BSR triggering conditions is associated with a PDU set including a group of PDUs associated with a frame of an application, and means for communicating, based on the BSR, with the network entity. The apparatus 1304 may further include means for performing any of the aspects described in connection with the flowcharts in FIG. 9 and FIG. 10, and/or aspects performed by the UE 802 in FIG. 8. The means may be the component 198 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

Figure 14:
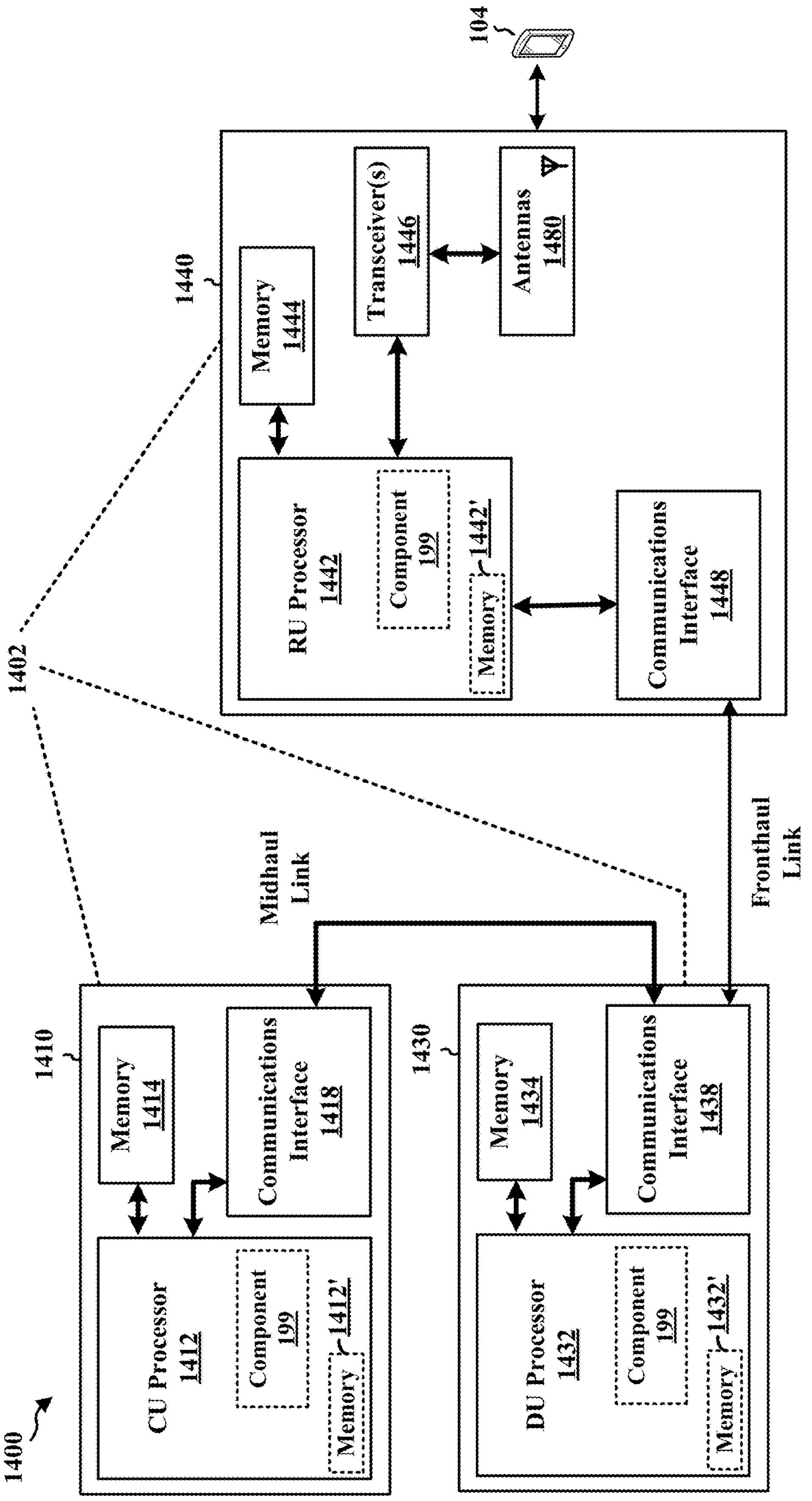
FIG. 14 is a diagram illustrating an example of a hardware implementation for an example network entity.

FIG. 14 is a diagram 1400 illustrating an example of a hardware implementation for a network entity 1402. The network entity 1402 may be a BS, a component of a BS, or may implement BS functionality. The network entity 1402 may include at least one of a CU 1410, a DU 1430, or an RU 1440. For example, depending on the layer functionality handled by the component 199, the network entity 1402 may include the CU 1410; both the CU 1410 and the DU 1430; each of the CU 1410, the DU 1430, and the RU 1440; the DU 1430; both the DU 1430 and the RU 1440; or the RU 1440. The CU 1410 may include at least one CU processor (or processing circuitry) 1412. The CU processor(s) (or processing circuitry) 1412 may include on-chip memory (or memory circuitry) 1412'. In some aspects, the CU 1410 may further include additional memory modules 1414 and a communications interface 1418. The CU 1410 communicates with the DU 1430 through a midhaul link, such as an F1 interface. The DU 1430 may include at least one DU processor (or processing circuitry) 1432. The DU processor(s) (or processing circuitry) 1432 may include on-chip memory (or memory circuitry) 1432'. In some aspects, the DU 1430 may further include additional memory modules 1434 and a communications interface 1438. The DU 1430 communicates with the RU 1440 through a fronthaul link. The RU 1440 may include at least one RU processor (or processing circuitry) 1442. The RU processor(s) (or processing circuitry) 1442 may include on-chip memory (or memory circuitry) 1442'. In some aspects, the RU 1440 may further include additional memory modules 1444, one or more transceivers 1446, antennas 1480, and a communications interface 1448. The RU 1440 communicates with the UE 104. The on-chip memory (or memory circuitry) 1412', 1432', 1442' and the additional memory modules 1414, 1434, 1444 may each be considered a computer-readable medium/memory (or memory circuitry). Each computer-readable medium/memory (or memory circuitry) may be non-transitory. Each of the processors (or processing circuitry) 1412, 1432, 1442 is responsible for general processing, including the execution of software stored on the computer-readable medium/memory (or memory circuitry). The software, when executed by the corresponding processor(s) (or processing circuitry) causes the processor(s) (or processing circuitry) to perform the various functions described supra. The computer-readable medium/memory (or memory circuitry) may also be used for storing data that is manipulated by the processor(s) (or processing circuitry) when executing software.

As discussed supra, the component 199 may be configured to receive, from a UE, a BSR, where the BSR is received in response to one BSR triggering condition of multiple BSR triggering conditions being met, wherein each of the multiple BSR triggering conditions is associated with a PDU set including a group of PDUs; and communicate, based on the BSR, with the UE. The component 199 may be further configured to perform any of the aspects described in connection with the flowcharts in FIG. 11 and FIG. 12, and/or performed by the base station 804 in FIG. 8. The component 199 may be within one or more processors (or processing circuitry) of one or more of the CU 1410, DU 1430, and the RU 1440. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1402 may include a variety of components configured for various functions. In one configuration, the network entity 1402 includes means for receiving, from a UE, a BSR, where the BSR is received in response to one BSR triggering condition of multiple BSR triggering conditions being met, wherein each of the multiple BSR triggering conditions is associated with a PDU set including a group of PDUs, and means for communicating, based on the BSR, with the UE. The network entity 1402 may further include means for performing any of the aspects described in connection with the flowcharts in FIG. 11 and FIG. 12, and/or aspects performed by the base station 804 in FIG. 8. The means may be the component 199 of the network entity 1402 configured to perform the functions recited by the means. As described supra, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means.

This disclosure provides a method for wireless communication at a UE. The method may include transmitting, to a network entity, a BSR in response to a BSR triggering condition from multiple BSR triggering conditions being met, wherein each of the multiple BSR triggering conditions is associated with a PDU set including a group of PDUs; and communicating, based on the BSR, with the network entity.

The method provides multiple BSR triggering conditions based on various scenarios in data transmission. The method allows the BSR information to be more readily available to the network and enables a more efficient resource allocation. Thus, it improves the efficiency of wireless communication.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data or "provide" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE. The method may include transmitting, to a network entity, a BSR in response to a BSR triggering condition from multiple BSR triggering conditions being met, where each of the multiple BSR triggering conditions is associated with a PDU set including a group of PDUs; and communicating, based on the BSR, with the network entity.

Aspect 2 is the method of aspect 1, where the multiple BSR triggering conditions may include one or more of: a latency condition of the PDU set; a condition relating to dropped PDUs in the PDU set; a flow condition of the PDU set; or an update condition of the PDU set.

Aspect 3 is the method of any of aspects 1 to 2, where the BSR may include a field indicating the BSR triggering condition.

Aspect 4 is the method of any of aspects 2 to 3, where the BSR triggering condition may be based on the latency condition of the PDU set, which is based on one or more of: a first elapsed time since the beginning of the PDU set; a second elapsed time since the last transmission resource received from the network entity associated with the PDU set; or a ratio of the first elapsed time to a PDU set delivery budget (PSDB).

Aspect 5 is the method of any of aspects 2 to 3, where the BSR triggering condition may be based on the condition relating to dropped PDUs in the PDU set, which is based on one or more of: a number of HARQ failures associated with the PDU set; an overall HARQ conclusion delay; or a number of timers discarded for the PDUs in the PDU set.

Aspect 6 is the method of any of aspects 2 to 3, where the PDU set may be a first PDU set, and the BSR triggering condition may be based on the flow condition of the first PDU set, which is based on at least one of: a second PDU set arrived on the same Radio Bearer (DRB) of the first PDU set; or a third PDU set arrived on a second DRB different from the DRB of the first PDU set.

Aspect 7 is the method of aspect 6, where the first PDU set and the second PDU set may be associated with the same flow or different flows.

Aspect 8 is the method of aspect 6, where the first PDU set and the second PDU set may have the same priority or different priorities.

Aspect 9 is the method of aspect 6, where the first PDU set and the third PDU set may be associated with the same PDU session or different PDU sessions.

Aspect 10 is the method of aspect 6, where the first PDU set and the third PDU set may have the same priority or different priorities.

Aspect 11 is the method of any of aspects 2 to 3, where the update condition of the PDU set may be based on: an increase or a decrease of data associated with the BSR from a BSR report time of the BSR to a receiving time for receiving a first grant associated with the BSR.

Aspect 12 is the method of any of aspects 1-11, where the multiple BSR triggering conditions may be based on traffic types of one or more PDU sessions associated with an application, and the traffic types may include one or more of: IPv4, IPv6, IPv4v6, ETH traffic, or unstructured traffic.

Aspect 13 is the method of any of aspects 1-11, where the multiple BSR triggering conditions may be based on slice characteristics associated with an application, and the slice characteristics may include one or more of: a slice type, a slice ID, or URSP rules.

Aspect 14 is the method of any of aspects 1-11, where the multiple BSR triggering conditions may be based on link characteristics associated with an application, and the link characteristics may include: the TN connection or the NTN connection.

Aspect 15 is the method of any of aspects 1-11, where the multiple BSR triggering conditions may be based on one or more of: SCS characteristics associated with an application, or a frequency band associated with the application. The frequency band may include one of the FR1 frequency band, the FR2 frequency band, or the FR4 frequency band.

Aspect 16 is an apparatus for wireless communication at a UE, comprising: a processing system that includes processor circuitry and memory circuitry that stores code and is coupled with the processor circuitry, the processing system configured to cause the UE to perform the method of one or more of aspects 1-15.

Aspect 17 is an apparatus for wireless communication at a UE, comprising: at least one memory; and at least one processor coupled to the at least one memory and, where the at least one processor, individually or in any combination, is configured to perform the method of any of aspects 1-15.

Aspect 18 is the apparatus for wireless communication at a UE, comprising means for transmitting, to a network entity, a BSR in response to a BSR triggering condition from multiple BSR triggering conditions being met, wherein each of the multiple BSR triggering conditions is associated with a PDU set including a group of PDUs, and means for communicating, based on the BSR, with the network entity.

Aspect 19 is the apparatus of aspect 18, further comprising means for performing each step in the method of any of aspects 2-15.

Aspect 20 is an apparatus of any of aspects 16-19, further comprising a transceiver configured to receive or to transmit in association with the method of any of aspects 1-15.

Aspect 21 is a computer-readable medium (e.g., a non-transitory computer-readable medium) storing computer executable code at a UE, the code when executed by at least one processor causes the at least one processor to, individually or in any combination, perform the method of any of aspects 1-15.

Aspect 22 is a method of wireless communication at a network entity. The method may include receiving, from a UE, a BSR, where the BSR is received in response to one BSR triggering condition of multiple BSR triggering conditions being met, and each of the multiple BSR triggering conditions is associated with a PDU set including a group of PDUs; and communicating, based on the BSR, with the UE.

Aspect 23 is the method of aspect 22, where the multiple BSR triggering conditions may include one or more of: a latency condition of the PDU set; a condition related to dropped PDUs in the PDU set; a flow condition of the PDU set; or an update condition of the PDU set.

Aspect 24 is the method of any of aspects 22 to 23, where the BSR may include a field indicating the BSR triggering condition.

Aspect 25 is the method of any of aspects 23 to 24, where the BSR triggering condition may be based on the latency condition of the PDU set, which is based on one or more of: a first elapsed time since the beginning of the PDU set; a second elapsed time since the last transmission resource received from the network entity associated with the PDU set; or a ratio of the first elapsed time to a PDU set delivery budget (PSDB).

Aspect 26 is the method of any of aspects 23 to 24, where the BSR triggering condition may be based on the condition relating to dropped PDUs in the PDU set, which is based on one or more of: the number of HARQ failures associated with the PDU set; the overall HARQ conclusion delay; or the number of timers discarded for the PDUs in the PDU set.

Aspect 27 is the method of any of aspects 23 to 24, wherein the PDU set is a first PDU set, and the BSR triggering condition may be based on the flow condition of the first PDU set, which is based on at least one of: a second PDU set arrived on the same DRB of the first PDU set; or a third PDU set arrived on a second DRB different from the DRB of the first PDU set.

Aspect 28 is the method of aspect 27, where the first PDU set and the second PDU set may be associated with the same flow or different flows.

Aspect 29 is the method of aspect 27, where the first PDU set and the second PDU set may have the same priority or different priorities.

Aspect 30 is the method of aspect 27, where the first PDU set and the third PDU set may be associated with the same PDU session or different PDU sessions.

Aspect 31 is the method of aspect 27, where the first PDU set and the third PDU set may have the same priority or different priorities.

Aspect 32 is the method of any of aspects 23 to 24, where the update condition of the PDU set may be based on an increase or a decrease of data associated with the BSR from a BSR report time of the BSR to a receiving time for receiving a first grant associated with the BSR.

Aspect 33 is the method of any of aspects 22 to 32, where, to communicate, based on the BSR, with the UE, the network entity may be configured to: increase transmission resources to the UE based on a PSDB of the PDU set and the BSR; or modify an MCS associated with the PDU set based on the BSR to improve the PSER of the PDU set.

Aspect 34 is the method of any of aspects 22 to 32, where the multiple BSR triggering conditions may be based on one or more of: traffic types of one or more PDU sessions associated with an application, where the traffic types include one or more of: IPv4, IPv6, IPv4v6, ETH traffic, or unstructured traffic; slice characteristics associated with the application, where the slice characteristics include one or more of: a slice type, a slice ID, or URSP rules; link characteristics associated with the application, where the link characteristics include the TN connection or the NTN connection; SCS characteristics associated with the application; or the frequency band associated with the application, where the frequency band includes one of: the FR1 frequency band, the FR2 frequency band, or the FR4 frequency band.

Aspect 35 is an apparatus for wireless communication at a network entity, comprising: a processing system that includes processor circuitry and memory circuitry that stores code and is coupled with the processor circuitry, the processing system configured to cause the network entity to perform the method of one or more of aspects 22-34.

Aspect 36 is an apparatus for wireless communication at a network entity, comprising: at least one memory; and at least one processor coupled to the at least one memory and, where the at least one processor, individually or in any combination, is configured to perform the method of any of aspects 22-34.

Aspect 37 is the apparatus for wireless communication at a network entity, comprising means for receiving, from a UE, a BSR, wherein the BSR is received in response to one BSR triggering condition of multiple BSR triggering conditions being met, wherein each of the multiple BSR triggering conditions is associated with a PDU set including a group of PDUs, and means for communicating, based on the BSR, with the UE.

Aspect 38 is the apparatus of aspect 37, further comprising means for performing each step in the method of any of aspects 23-34.

Aspect 39 is an apparatus of any of aspects 35-38, further comprising a transceiver configured to receive or to transmit in association with the method of any of aspects 22-34.

Aspect 40 is a computer-readable medium (e.g., a non-transitory computer-readable medium) storing computer executable code at a network entity, the code when executed by at least one processor causes the at least one processor to, individually or in any combination, perform the method of any of aspects 22-34.

What is claimed is:

1. An apparatus for wireless communication at a user equipment (UE), comprising:

at least one memory; and at least one processor coupled to the at least one memory and, based at least in part on information stored in the at least one memory, the at least one processor is configured to cause the UE to:

transmit, to a network entity, a buffer status reporting (BSR) in response to a BSR triggering condition from multiple BSR triggering conditions being met, wherein each of the multiple BSR triggering conditions is associated with a Protocol Data Unit (PDU) set including a group of PDUs, wherein the BSR includes a field indicating a BSR type, and wherein the BSR type indicates a reason the BSR is triggered; and communicate, based on the BSR, with the network entity.

2. The apparatus of claim 1, further comprising a transceiver coupled to the at least one processor, wherein, to transmit the BSR, the at least one processor is configured to transmit the BSR via the transceiver, and wherein the multiple BSR triggering conditions include one or more of:

a latency condition of the PDU set;

a condition relating to dropped PDUs in the PDU set;

a flow condition of the PDU set; or an update condition of the PDU set.

3. The apparatus of claim 2, wherein the field indicating the BSR type is associated with the BSR triggering condition.

4. The apparatus of claim 2, wherein the BSR triggering condition is based on the latency condition of the PDU set, which is based on one or more of:

a first elapsed time since a beginning of the PDU set;

a second elapsed time since a last transmission resource received from the network entity associated with the PDU set; or a ratio of the first elapsed time to a PDU set delivery budget (PSDB).

5. The apparatus of claim 2, wherein the BSR triggering condition is based on the condition relating to the dropped PDUs in the PDU set, which is based on one or more of:

a number of hybrid automatic repeat request (HARQ) failures associated with the PDU set;

an overall HARQ conclusion delay; or a number of timers discarded for the PDUs in the PDU set.

6. The apparatus of claim 2, wherein the PDU set is a first PDU set, and wherein the BSR triggering condition is based on the flow condition of the first PDU set, which is based on at least one of:

a second PDU set arrived on a same radio bearer (DRB) of the first PDU set; or a third PDU set arrived on a second DRB different from the DRB of the first PDU set.

7. The apparatus of claim 6, wherein the first PDU set and the second PDU set are associated with a same flow or different flows.

8. The apparatus of claim 6, wherein the first PDU set and the second PDU set have a same priority or different priorities.

9. The apparatus of claim 6, wherein the first PDU set and the third PDU set are associated with a same PDU session or different PDU sessions.

10. The apparatus of claim 6, wherein the first PDU set and the third PDU set have a same priority or different priorities.

11. The apparatus of claim 2, wherein the BSR triggering condition is based on the update condition of the PDU set, which is based on:

an increase or a decrease of data associated with the BSR from a BSR report time of the BSR to a receiving time for receiving a first grant associated with the BSR.

12. The apparatus of claim 1, wherein the multiple BSR triggering conditions are based on traffic types of one or more PDU sessions associated with an application, wherein the traffic types include one or more of:

Internet Protocol version 4 (IPv4),

Internet Protocol version 6 (IPv6),

IPv4 & IPv6 (IPv4v6),

Ethernet (ETH) traffic, or unstructured traffic.

13. The apparatus of claim 1, wherein the multiple BSR triggering conditions are based on slice characteristics associated with an application, wherein the slice characteristics comprise one or more of:

a slice type, a slice ID, or

UE route selection policy (URSP) rules.

14. The apparatus of claim 1, wherein the multiple BSR triggering conditions are based on link characteristics associated with an application, wherein the link characteristics comprises:

a terrestrial network (TN) connection, or a non-terrestrial network (NTN) connection.

15. The apparatus of claim 1, wherein the multiple BSR triggering conditions are based on one or more of:

SCS characteristics associated with an application, or a frequency band associated with the application.

16. An apparatus for wireless communication at a network entity, comprising:

at least one memory; and at least one processor coupled to the at least one memory and, based at least in part on information stored in the at least one memory, the at least one processor is configured to cause the network entity to:

receive, from a user equipment (UE), a buffer status reporting (BSR), wherein the BSR is received in response to one BSR triggering condition of multiple BSR triggering conditions being met, wherein each of the multiple BSR triggering conditions is associated with a Protocol Data Unit (PDU) set including a group of PDUs, wherein the BSR includes a field indicating a BSR type, and wherein the BSR type indicates a reason the BSR is triggered; and communicate, based on the BSR, with the UE.

17. The apparatus of claim 16, further comprising a transceiver coupled to the at least one processor, wherein, to receive the BSR, the at least one processor is configured to receive the BSR via the transceiver, and wherein the multiple BSR triggering conditions include one or more of:

a latency condition of the PDU set;

a condition related to dropped PDUs in the PDU set;

a flow condition of the PDU set; or an update condition of the PDU set.

18. The apparatus of claim 17, wherein the field indicating the BSR type is associated with the one BSR triggering condition.

19. The apparatus of claim 17, wherein the one BSR triggering condition is based on the latency condition of the PDU set, which is based on one or more of:

a first elapsed time since a beginning of the PDU set;

a second elapsed time since a last transmission resource received from the network entity associated with the PDU set; or a ratio of the first elapsed time to a PDU set delivery budget (PSDB).

20. The apparatus of claim 17, wherein the one BSR triggering condition is based on the condition related to the dropped PDUs in the PDU set, which is based on one or more of:

a number of hybrid automatic repeat request (HARQ) failures associated with the PDU set;

an overall HARQ conclusion delay; or a number of timers discarded for the PDUs in the PDU set.

21. The apparatus of claim 17, wherein the PDU set is a first PDU set, and wherein the one BSR triggering condition is based on the flow condition of the first PDU set, which is based on at least one of:

a second PDU set arrived on a same Radio Bearer (DRB) of the first PDU set; or a third PDU set arrived on a second DRB different from the DRB of the first PDU set.

22. The apparatus of claim 21, wherein the first PDU set and the second PDU set are associated with a same flow or different flows.

23. The apparatus of claim 21, wherein the first PDU set and the second PDU set have a same priority or different priorities.

24. The apparatus of claim 21, wherein the first PDU set and the third PDU set are associated with a same PDU session or different PDU sessions.

25. The apparatus of claim 21, wherein the first PDU set and the third PDU set have a same priority or different priorities.

26. The apparatus of claim 17, wherein the one BSR triggering condition is based on the update condition of the PDU set, which is based on:

an increase or a decrease of data associated with the BSR from a BSR report time of the BSR to a receiving time for receiving a first grant associated with the BSR.

27. The apparatus of claim 16, wherein, to communicate, based on the BSR, with the UE, the at least one processor is configured to cause the network entity to:

increase transmission resources to the UE based on a PDU set delivery budget (PSDB) of the PDU set and the BSR; or modify a modulation and coding scheme (MCS) associated with the PDU set based on the BSR to improve a PDU set error rate (PSER) of the PDU set.

28. The apparatus of claim 16, wherein the multiple BSR triggering conditions are based on one or more of:

traffic types of one or more PDU sessions associated with an application, wherein the traffic types include one or more of: Internet Protocol version 4 (IPv4), Internet Protocol version 6 (IPv6), IPv4 & IPv6 (IPv4v6), Ethernet (ETH) traffic, or unstructured traffic;

slice characteristics associated with the application, wherein the slice characteristics comprise one or more of: a slice type, a slice ID, or UE route selection policy (URSP) rules;

link characteristics associated with the application, wherein the link characteristics comprise a terrestrial network (TN) connection, or a non-terrestrial network (NTN) connection;

SCS characteristics associated with the application; or a frequency band associated with the application.

29. A method of wireless communication at a user equipment (UE), comprising:

transmitting, to a network entity, a buffer status reporting (BSR) in response to a BSR triggering condition from multiple BSR triggering conditions being met, wherein each of the multiple BSR triggering conditions is associated with a Protocol Data Unit (PDU) set including a group of PDUs, wherein the BSR includes a field indicating a BSR type, and wherein the BSR type indicates a reason the BSR is triggered; and communicating, based on the BSR, with the network entity.

30. A method of wireless communication at a network entity, comprising:

receiving, from a user equipment (UE), a buffer status reporting (BSR), wherein the BSR is received in response to one BSR triggering condition of multiple BSR triggering conditions being met, wherein each of the multiple BSR triggering conditions is associated with a Protocol Data Unit (PDU) set including a group of PDUs, wherein the BSR includes a field indicating a BSR type, and wherein the BSR type indicates a reason the BSR is triggered; and communicating, based on the BSR, with the UE.

* * * * *